(12) United States Patent
Masuda et al.

(10) Patent No.: US 9,841,923 B2
(45) Date of Patent: Dec. 12, 2017

(54) STORAGE APPARATUS AND STORAGE SYSTEM

(71) Applicant: FUJITSU LIMITED, Kawasaki-shi, Kanagawa (JP)

(72) Inventors: Ryoko Masuda, Nagoya (JP); Takashi Kawada, Yokohama (JP); Hajime Kondo, Kawasaki (JP); Akihiro Ueda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 206 days.

(21) Appl. No.: 14/967,531

(22) Filed: Dec. 14, 2015

(65) Prior Publication Data

US 2016/0179393 A1 Jun. 23, 2016

(30) Foreign Application Priority Data

Dec. 19, 2014 (JP) .................................. 2014-257122
Oct. 30, 2015 (JP) .................................. 2015-214061

(51) Int. Cl.
*G06F 3/06* (2006.01)

(52) U.S. Cl.
CPC ............ *G06F 3/065* (2013.01); *G06F 3/0604* (2013.01); *G06F 3/0683* (2013.01)

(58) Field of Classification Search
CPC ...... G06F 3/065; G06F 3/0604; G06F 3/0683; G06F 3/0646; G06F 3/0647
See application file for complete search history.

(56) References Cited

U.S. PATENT DOCUMENTS

| 5,155,845 | A | * | 10/1992 | Beal | .................... G06F 11/2058 714/6.12 |
| 2003/0005350 | A1 | * | 1/2003 | Koning | ............... H04L 67/1002 714/4.11 |
| 2003/0126107 | A1 | | 7/2003 | Yamagami | |
| 2003/0126388 | A1 | * | 7/2003 | Yamagami | .......... G06F 11/2058 711/162 |
| 2004/0260873 | A1 | * | 12/2004 | Watanabe | ........... G06F 11/2058 711/114 |
| 2008/0104443 | A1 | * | 5/2008 | Akutsu | ............... G06F 11/2058 714/6.12 |

(Continued)

FOREIGN PATENT DOCUMENTS

| JP | 2003-233518 | 8/2003 |
| JP | 2010-39986 | 2/2010 |

*Primary Examiner* — Hiep Nguyen
(74) *Attorney, Agent, or Firm* — Fujitsu Patent Center

(57) ABSTRACT

While in active state, a first storage apparatus including first and second storage areas copies data stored in the first storage area to the second storage area, copies data stored in the first storage area to a third storage area so that data is synchronized between the first and third storage areas, and copies data stored in the second storage area to a fourth storage area so that data is synchronized between the second and fourth storage areas. When a second storage apparatus including the third and fourth storage areas has transitioned from standby to active state and thereby gets to receive access to the third storage area, instead of to the first storage area, from an external information processing apparatus, the second storage apparatus copies data stored in the third storage area to the fourth storage area, based on setting information stored in a storage unit.

7 Claims, 21 Drawing Sheets

(56) References Cited

U.S. PATENT DOCUMENTS

| | | | |
|---|---|---|---|
| 2010/0036896 A1* | 2/2010 | Nakagawa | G06F 11/1456 707/E17.009 |
| 2011/0040935 A1* | 2/2011 | Murayama | G06F 3/0605 711/114 |
| 2011/0099345 A1* | 4/2011 | Mitsui | G06F 11/2069 711/162 |
| 2012/0030440 A1* | 2/2012 | Miwa | G06F 3/0617 711/162 |
| 2013/0024635 A1* | 1/2013 | Araki | G06F 3/0605 711/162 |
| 2016/0004616 A1* | 1/2016 | Narita | G06F 12/00 714/6.3 |

* cited by examiner

STORAGE APPARATUS AND STORAGE SYSTEM

CROSS-REFERENCE TO RELATED APPLICATIONS

This application is based upon and claims the benefit of priority of the prior Japanese Patent Application No. 2014-257122, filed on Dec. 19, 2014, and the Japanese Patent Application No. 2015-214061, filed on Oct. 30, 2015, the entire contents of which are incorporated herein by reference.

FIELD

The embodiments discussed herein relate to a storage apparatus and a storage system.

BACKGROUND

There is a known technique in which a plurality of storage apparatuses are clustered so that, if one of the clustered storage apparatuses stops due to a failure or another problem, another storage apparatus takes over its role. For example, two storage apparatuses are clustered, and the data stored in a storage area of one active storage apparatus, which is accessed from a host device, is copied to a storage area of the other standby storage apparatus so as to synchronize these storage areas. Then, if the active storage apparatus stops, a storage area to be accessed from the host device is changed to the storage area of the other storage apparatus, so as to allow the host device to keep on performing its tasks.

In addition, there is proposed a technique in which the data stored in a storage area of one storage apparatus is copied to a storage area of another storage apparatus, and further the data stored in the copy destination storage area is copied to another storage area within the other storage apparatus. There is also proposed a technique in which, in addition to the above copies, the data stored in the copy source storage area is copied to another storage area within the one storage apparatus.

Please see, for example, Japanese Laid-open Patent Publications Nos. 2003-233518 and 2010-39986.

One of systems employing the above techniques in which storage apparatuses are clustered is as follows. A first storage apparatus having first and second storage areas and a second storage apparatus having third and fourth storage areas are clustered. The first storage apparatus, while in active state, backs up the data stored in the first storage area, which is accessed from a host device, to the second storage area. In addition, the data stored in the first storage area is copied to the third storage area, and the data stored in the second storage area is copied to the fourth storage area, in order that data is synchronized between copy source and copy destination storage areas.

In the system as described above, when the first storage apparatus stops and the third storage area starts to get accessed from a host device, the fourth storage area already contains a backup of the data stored in the third storage area. Therefore, a failover is performed without losing data redundancy.

However, in order to back up the data stored in the third storage area to the fourth storage area after a failover, an administrator needs to make some settings to execute the backup. Therefore, it takes time to back up the data of the third storage area to thereby ensure the safety of the data after the host device starts to update the data in the third storage area.

SUMMARY

According to one aspect, there is provided a storage apparatus including: a storage device including a first storage area, a second storage area, and a third storage area, the third storage area storing setting information for performing a first copy process of copying data stored in the first storage area to the second storage area; and a processor that performs a procedure including: stopping the first copy process based on the setting information under a first state where a different storage apparatus including a fourth storage area and a fifth storage area is in active state and performs a first access process, a second copy process, a third copy process, and a fourth copy process and the storage apparatus is in standby state, the first access process being to access the fourth storage area in response to a request from an information processing apparatus, the second copy process being to copy data stored in the fourth storage area to the fifth storage area, the third copy process being to copy data stored in the fourth storage area to the first storage area so that data in the fourth storage area and data in the first storage area are synchronized with each other, the fourth copy process being to copy data stored in the fifth storage area to the second storage area so that data in the fifth storage area and data in the second storage area are synchronized with each other; and performing a second access process of accessing the first storage area in response to a request from the information processing apparatus and the first copy process based on the setting information under a second state where the different storage apparatus has transitioned to standby state and the storage apparatus has transitioned to active state.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
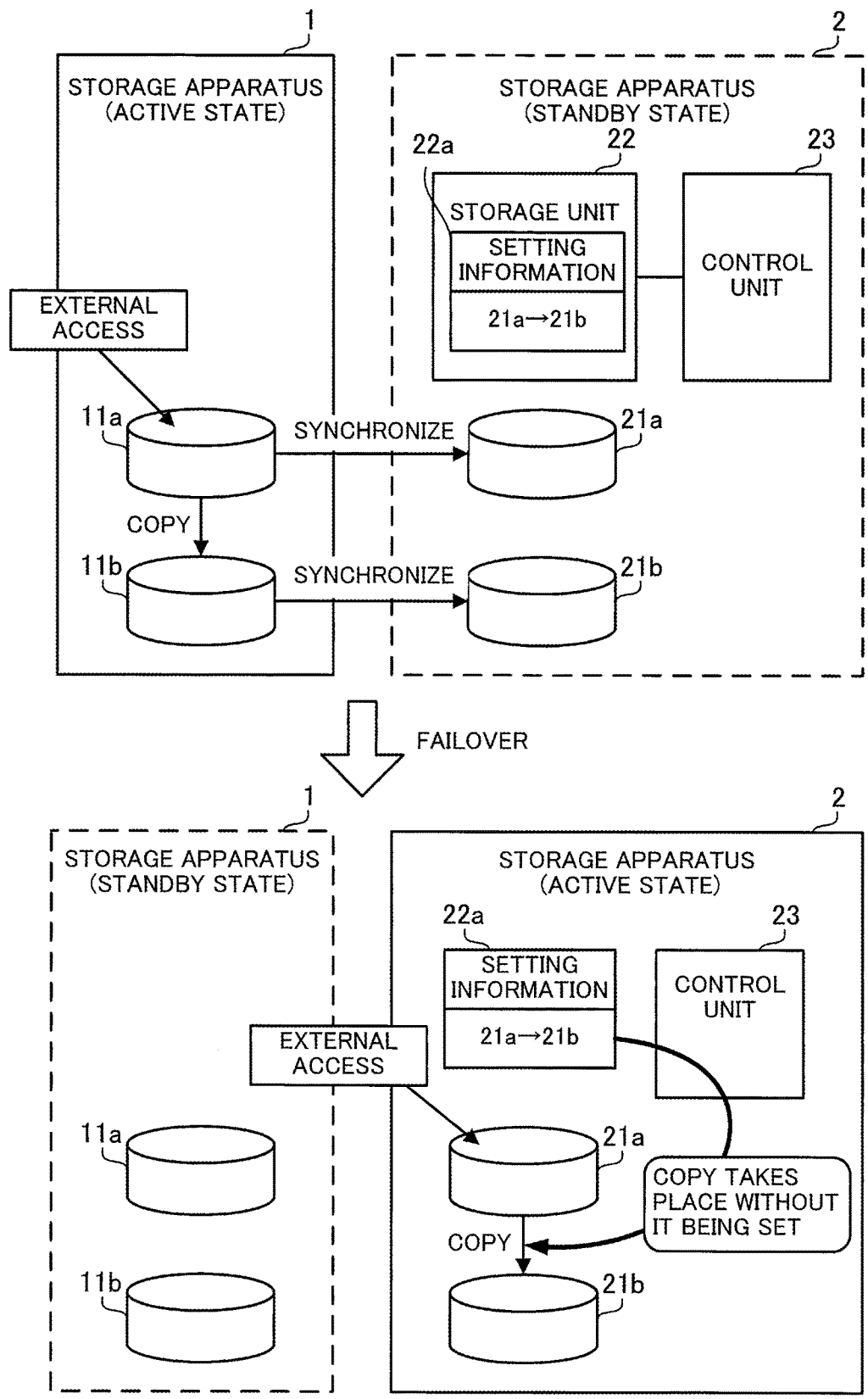
FIG. 1 illustrates an example of configuration and performance of a storage system according to a first embodiment.

Several embodiments will be described below with reference to the accompanying drawings, wherein like reference numerals refer to like elements throughout.

First Embodiment

FIG. 1 illustrates an example of configuration and performance of a storage system according to a first embodiment. A storage system of FIG. 1 includes storage apparatuses 1 and 2.

The storage apparatus 1 includes storage areas 11a and 11b. For example, these storage areas 11a and 11b are implemented by using one or more storage devices, such as a Hard Disk Drive (HDD) or Solid State Drive (SSD), mounted in the storage apparatus 1. Likewise, the storage apparatus 2 includes storage areas 21a and 21b, which are implemented by using one or more storage devices, such as an HDD or SSD, mounted in the storage apparatus 2, for example.

One of the storage apparatuses 1 and 2 is in active state, and the other is in standby state. The storage apparatus 1, while in active state, receives access to the storage area 11a from an external information processing apparatus, not illustrated. The storage apparatus 2, while in active state, receives access to the storage area 21a from the information processing apparatus.

In the following, it is assumed that the storage apparatus 1 is in active state, whereas the storage apparatus 2 is in standby state.

The storage apparatus 1, while in active state, copies data stored in the storage area 11a to the storage area 11b. By doing so, the storage apparatus 1 does not need to access another storage apparatus when data in the storage area 11a is broken, but the storage apparatus 1 is able to restore the data using its backup data stored in the locally owned storage area 11b.

Further, the storage apparatus 1 in active state copies the data stored in the storage area 11a to the storage area 21a so that the data in the storage area 11a and the data in the storage area 21a are synchronized with each other. Thereby, after a failover has occurred and the storage apparatus 2 has transitioned to active state, the storage apparatus 2 receives access to the storage area 21a, instead of to the storage area 11a, from the information processing apparatus, thereby allowing the information processing apparatus to keep on performing its tasks.

Still further, the storage apparatus 1 in active state copies data stored in the storage area 11b to the storage area 21b so that the data in the storage area 11b and the data in the storage area 21b are synchronized with each other. By doing so, in the storage apparatus 2, the storage area 21b already contains the backup data of the storage area 21a when a failover occurs. This improves the safety of data.

The storage apparatus 2 includes a storage unit 22 and a control unit 23. The storage unit 22 is implemented by using a storage device, such as a Random Access Memory (RAM) or an HDD, mounted in the storage apparatus 2, for example. The control unit 23 is implemented by using a processor provided in the storage apparatus 2 or a processor provided in a control device, not illustrated, within the storage apparatus 2, for example.

The storage unit 22 stores therein setting information 22a for performing a process of copying data stored in the storage area 21a to the storage area 21b. The setting information 22a is stored in the storage unit by using a management device, not illustrated, at least before the storage apparatus 2 transitions from standby state to active state.

As illustrated in the upper part of FIG. 1, the control unit 23 does not perform a copy process based on the setting information 22a while the storage apparatus 2 is in standby state. Then, when a failover has occurred and the storage apparatus 2 has transitioned from standby state to active state, the control unit 23 copies data stored in the storage area 21a to the storage area 21b in accordance with the setting information 22a, as illustrated in the lower part of FIG. 1. The copy process based on the setting information 22a may be performed at a desired time after the storage apparatus 2 transitions to active state.

As described above, the data stored in the storage area 21a is copied to the storage area 21b when the storage apparatus 2 transitions to active state. Thereby, the content of data updates made to the storage area 21a in response to requests from an information processing apparatus after a failover is reflected on the backup data stored in the storage area 21b. This improves the safety of data that is used in processing after a failover occurs.

In addition to this, the setting information 22a is stored in the storage unit 22 before the storage apparatus 2 transitions to active state. Thereby, the storage apparatus 2 is able to copy data stored in the storage area 21a to the storage area 21b with reference to the setting information 22a at any time after transitioning to active state. That is, the data copy from the storage area 21a to the storage area 21b may take place without it being set by an administrator. Thus, it is possible to back up the data stored in the storage area 21a to the storage area 21b to thereby improve the safety of the data in a short time after the information processing apparatus starts to update the data in the storage area 21a.

Second Embodiment

Figure 2:
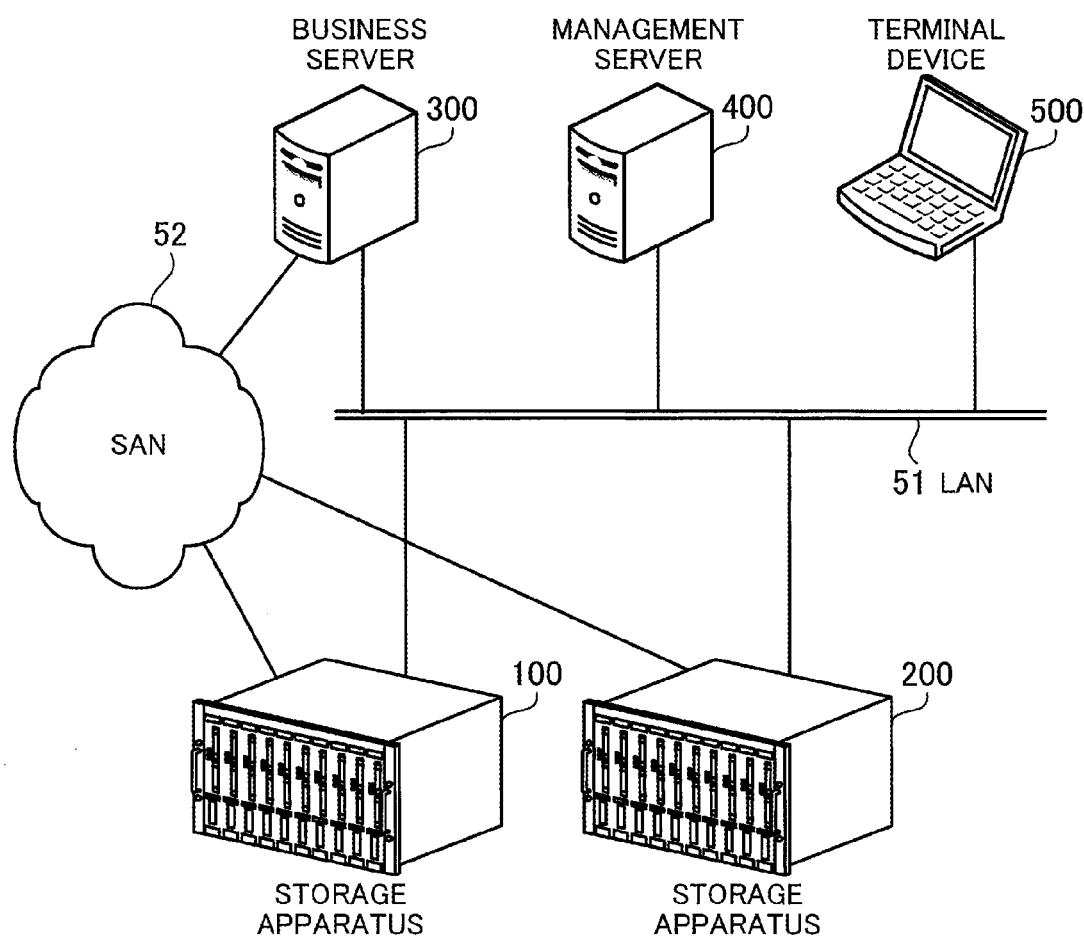
FIG. 2 illustrates an example of a configuration of a storage system according to a second embodiment.

FIG. 2 illustrates an example of a configuration of a storage system according to a second embodiment. A storage system of FIG. 2 includes storage apparatuses 100 and 200, a business server 300, a management server 400, and a terminal device 500. For example, these storage apparatuses 100 and 200, business server 300, management server 400, and terminal device 500 are connected to each other via a Local Area Network (LAN) 51, and the storage apparatuses 100 and 200 and business server 300 are connected to each other via a Storage Area Network (SAN) 52.

In this connection, the storage apparatus 100 is an example of the storage apparatus 1 of FIG. 1, and the storage apparatus 200 is an example of the storage apparatus 2 of FIG. 1.

The storage apparatus 100 controls access from the business server 300 to a logical volume locally configured in the storage apparatus 100. Likewise, the storage apparatus 200 controls access from the business server 300 to a logical volume locally configured in the storage apparatus 200.

Of the storage apparatuses 100 and 200, one is in active state and the other is in standby state. The storage apparatus in active state receives access from the business server 300. In addition, the storage apparatus in active state backs up data stored in its locally owned logical volume to the storage apparatus in standby state. Then, when a failover has occurred and thereby the storage apparatus in standby state has transitioned to active state, this storage apparatus, now in active state, receives access to a logical volume storing the backup data from the business server 300. That is to say, even when one storage apparatus stops its operation due to a failure or another problem, the business server 300 is allowed to use the other storage apparatus to keep on performing its tasks.

In the system of this embodiment, it is assumed that the storage apparatus 100 is used as primary storage and the storage apparatus 200 is used as secondary storage, and that, when the system starts to operate, the storage apparatus 100 is set to active state and the storage apparatus 200 is set to standby state.

The business server 300 is a server computer that performs a variety of business-related processes. The business server 300 accesses a logical volume configured in an active one of the storage apparatuses 100 and 200.

The management server 400 is a server computer that manages the operations of the storage apparatuses 100 and 200. The management server 400 is designed to configure a variety of settings on the storage apparatuses 100 and 200 in accordance with, for example, administrator's inputs made on the terminal device 500.

The terminal device 500 is a client computer that is used by the administrator of the storage system. The administrator operates the terminal device 500, for example, in order to configure a variety of settings on the storage apparatuses 100 and 200 via the management server 400 and also to configure a variety of settings on the business server 300, for example.

Figure 3:
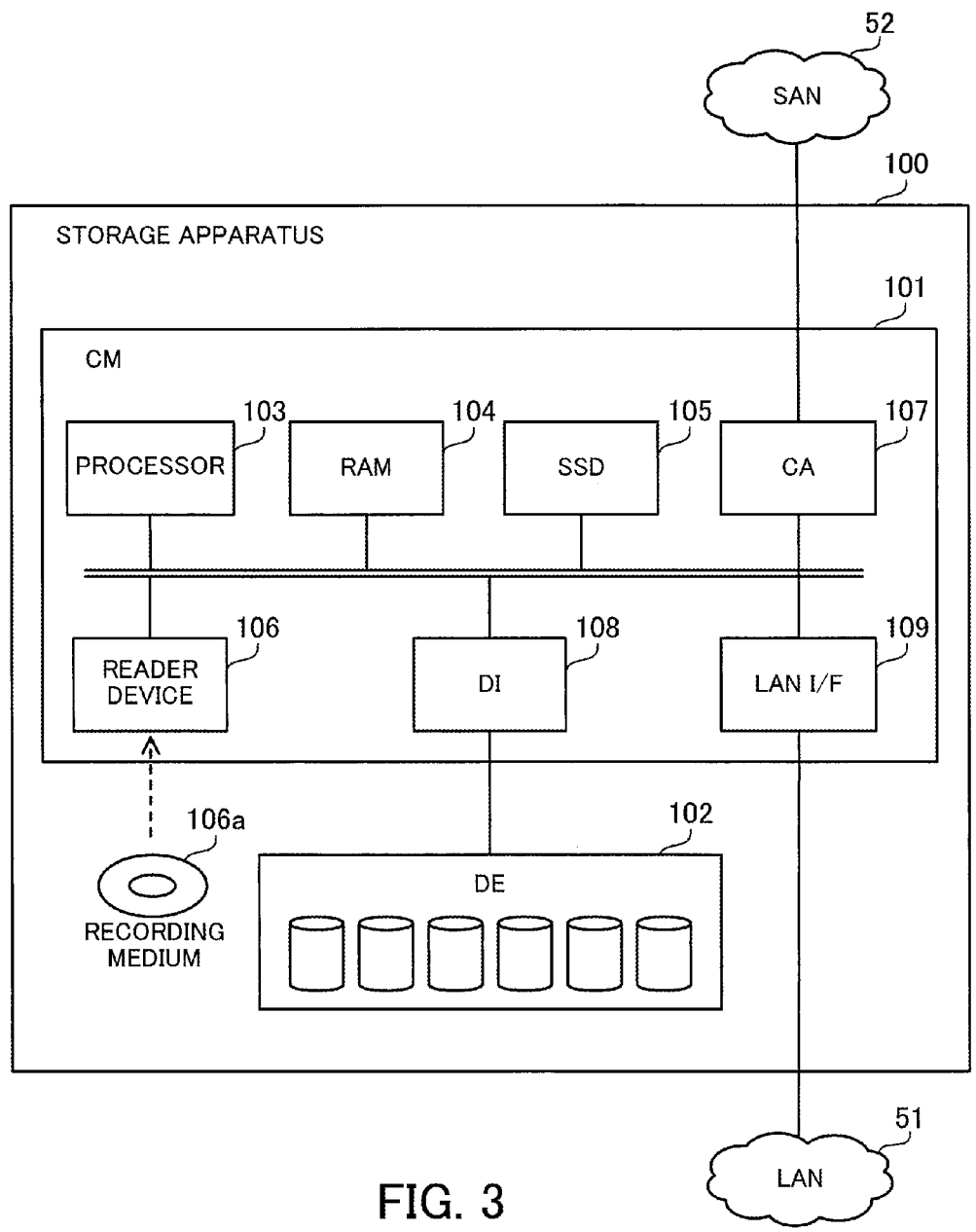
FIG. 3 illustrates an example of a hardware configuration of a storage apparatus.

FIG. 3 illustrates an example of a hardware configuration of a storage apparatus. The storage apparatus 100 includes a controller module (CM) 101 and a drive enclosure (DE) 102. In this connection, the storage apparatus 100 may be provided with a plurality of controller modules or drive enclosures.

The drive enclosure 102 includes a plurality of storage devices for storing data that is accessed from the business server 300. For example, an HDD, SSD, and the like are mounted in the drive enclosure 102 as the storage devices. The controller module 101 accesses a storage device in the drive enclosure 102 in response to an access request from the business server 300.

The controller module 101 is entirely controlled by the processor 103. The processor 103 may be a multiprocessor. The processor 103 is a Central Processing Unit (CPU), Micro Processing Unit (MPU), Digital Signal Processor (DSP), Application Specific Integrated Circuit (ASIC), or Programmable Logic Device (PLD), for example. The processor 103 may be a combination of two or more selected from a CPU, an MPU, a DSP, an ASIC, a PLD, and others.

To the processor 103, the RAM 104 and a plurality of peripheral devices are connected via a bus.

The RAM 104 serves as a primary storage device of the controller module 101. The RAM 104 temporarily stores at least part of Operating System (OS) programs and application programs to be executed by the processor 103. The RAM 104 also stores a variety of data that the processor 103 uses in processing.

The peripheral devices connected to the bus include an SSD 105, a reader device 106, a channel adapter (CA) 107, a drive interface (DI) 108, and a LAN interface (I/F) 109.

The SSD 105 serves as a secondary storage device of the controller module 101. The SSD 105 stores OS programs, application programs, and a variety of data. As the secondary storage device, another type of non-volatile storage device, such as an HDD, may be used.

To the reader device 106, a portable recording medium 106a is detachably attached. The reader device 106 reads data from the portable recording medium 106a and gives the read data to the processor 103. As the portable recording medium 106a, an optical disc, a magneto-optical disk, a semiconductor memory, or the like may be used.

The channel adapter 107 is an interface for achieving communication with the business server 300 and storage apparatus 200 via the SAN 52. The drive interface 108 achieves communication with the storage devices mounted in the drive enclosure 102. The LAN interface 109 achieves communication with the management server 400 via the LAN 51.

In this connection, the storage apparatus 200 may be implemented with the same hardware configuration as the storage apparatus 100. That is, the storage apparatus 200 includes a controller module and a drive enclosure including a plurality of storage devices.

In addition, in the following description, the storage apparatus 100 being in active or standby state is equivalent to the controller module 101 thereof being in active or standby state. Similarly, the storage apparatus 200 being in active or standby state is equivalent to the controller module thereof being in active or standby state.

Figure 4:
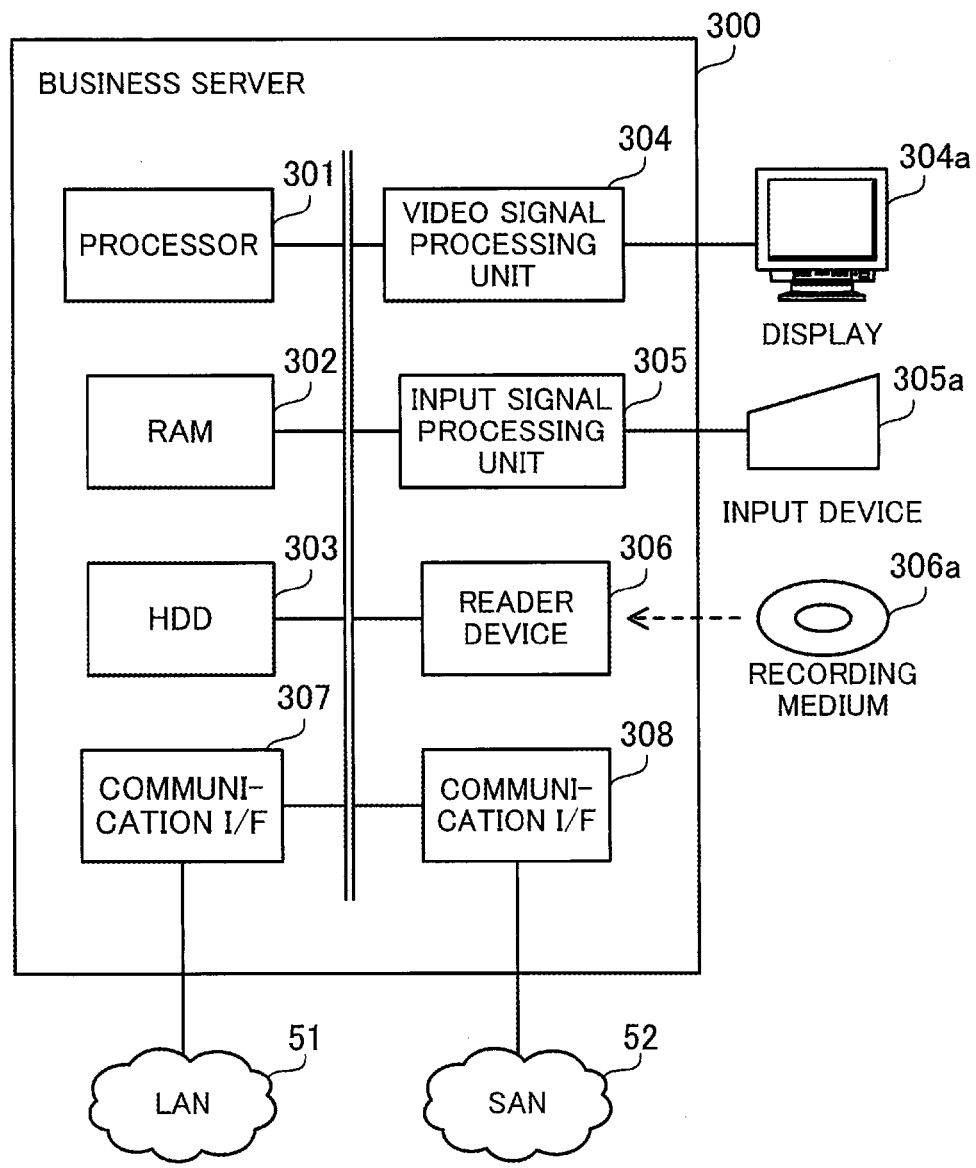
FIG. 4 illustrates an example of a hardware configuration of a business server.

FIG. 4 illustrates an example of a hardware configuration of a business server. The business server 300 is entirely controlled by a processor 301. The processor 301 may be a multiprocessor. The processor 301 is a CPU, MPU, DSP, ASIC, or PLD, for example. The processor 301 may be a combination of two or more selected from a CPU, an MPU, a DSP, an ASIC, and a PLD.

To the processor 301, a RAM 302 and a plurality of peripheral devices are connected via a bus.

The RAM 302 serves as a primary storage device of the business server 300. The RAM 302 temporarily stores at least part of OS programs and application programs to be executed by the processor 301. The RAM 302 also stores a variety of data that the processor 301 uses in processing.

The peripheral devices connected to the bus include an HDD 303, a video signal processing unit 304, an input signal processing unit 305, a reader device 306, and communication interfaces 307 and 308.

The HDD 303 serves as a secondary storage device of the business server 300. The HDD 303 stores OS programs, application programs, and a variety of data. As the secondary storage device, another type of non-volatile storage device, such as an SSD, may be used.

To the video signal processing unit 304, a display 304a is connected. The video signal processing unit 304 displays images on the display 304a in accordance with instructions from the processor 301. As the display 304a, a liquid crystal display, an organic electroluminescence (EL) display, or the like may be used.

To the input signal processing unit 305, an input device 305a is connected. The input signal processing unit 305 transfers signals based on inputs made on the input device, to the processor 301. As the input device 305a, a keyboard, a mouse, a touch pad, a trackball, or the like may be used, for example.

A portable recording medium 306a is detachably attached to the reader device 306. The reader device 306 reads data from the portable recording medium 306a and gives the read data to the processor 301. As the portable recording medium 306a, an optical disc, a magneto-optical disk, a semiconductor memory, or the like may be used.

The communication interface 307 achieves communication with the management server 400 and the terminal device 500 over the LAN 51. The communication interface 308 achieves communication with the storage apparatuses 100 and 200 via the SAN 52.

In this connection, the management server 400 and the terminal device 500 may be implemented with the same hardware configuration as the business server 300.

Figure 5:
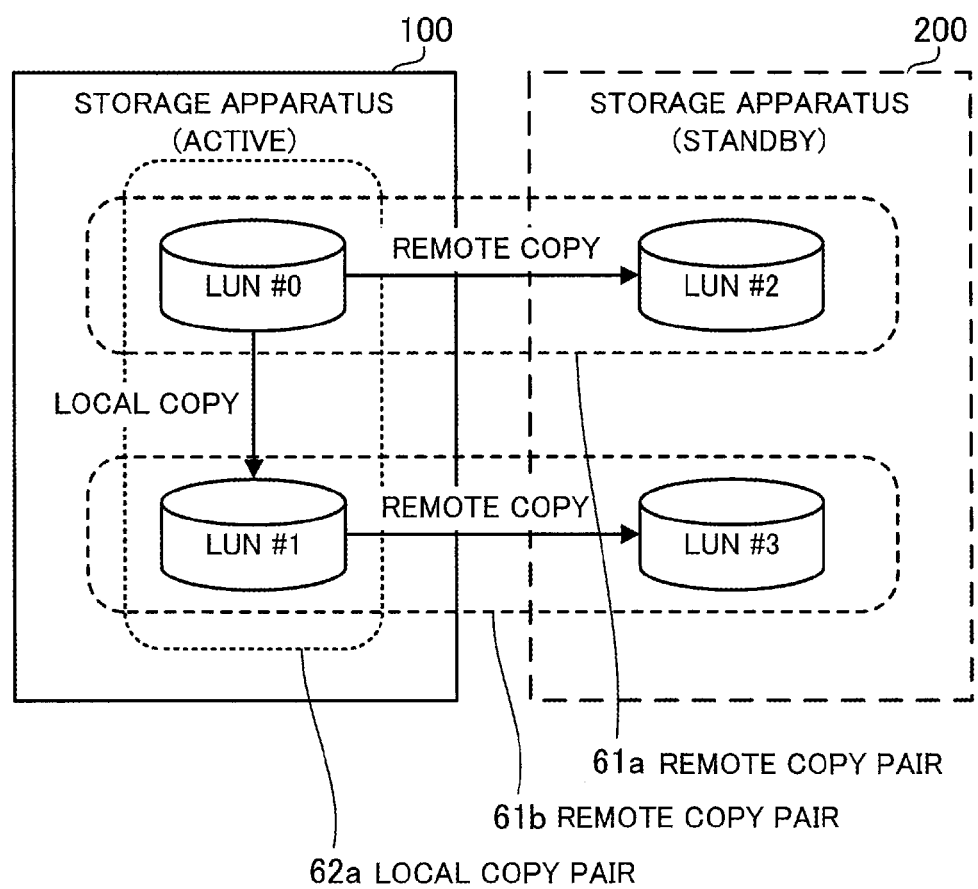
FIG. 5 is a view for describing the outline of copy processes that are performed in storage apparatuses.

FIG. 5 is a view for describing the outline of copy processes that are performed in storage apparatuses. In FIG. 5, it is assumed that the storage apparatus 100 is in active state and the storage apparatus 200 is in standby state, by way of example. In addition, a logical volume with an identifier number "X" may be indicated as "LUN #X." In this embodiment, it is assumed that LUN #0 and LUN #1 are configured in the storage apparatus 100, and LUN #2 and LUN #3 are configured in the storage apparatus 200.

The storage apparatuses 100 and 200 are clustered as an apparatus pair in a failover configuration. In these clustered storage apparatuses 100 and 200, their local logical volumes are mutually registered as a "remote copy pair", so that data gets synchronized between these logical volumes. That is to say, with respect to logical volumes registered as a remote copy pair, when data in the logical volume of a storage apparatus in active state is updated, this update is immediately reflected on the other logical volume. For example, when data in a storage apparatus in active state is updated to new data, the new data is sent to the storage apparatus in standby state, and data at the corresponding location in the other logical volume is updated to the new data. In the following, a "remote copy" may refer to a copy process between logical volumes registered as a remote copy pair.

In this embodiment, it is assumed that the LUN #0 and LUN #2 are registered as a remote copy pair 61a, and the LUN #1 and LUN #3 are registered as a remote copy pair 61b. As illustrated in FIG. 5, when the storage apparatus 100 is in active state, data in the LUN #0 is remotely copied to the LUN #2, and data in the LUN #1 is remotely copied to the LUN #3.

In addition, in the storage apparatus 100 in active state, the LUN #0 and LUN #1 are registered as a local copy pair 62a, and data in the LUN #0 is copied to the LUN #1. In the following, a "local copy" may refer to a copy process between logical volumes registered as a local copy pair. In the storage apparatus 100 in active state, data in the LUN #0 to be accessed from the business server 300 is locally copied to the other LUN #1. Thereby, the storage apparatus 100 is able to restore the data using the locally owned LUN #1 without using data stored in the other storage apparatus 200.

The local copy in this embodiment is a process of recording actual data corresponding to a snapshot of a copy source volume in a copy destination volume. Furthermore, a copy process from a copy source volume to a copy destination volume is performed in the background while an access control process of controlling access to the copy source volume is performed in response to requests from the business server 300. In addition, in the second or subsequent round of the local copy, only data updated as requested by the business server 300 after the start of the previous round of the local copy is copied to the copy destination volume.

The following specifically describes how to execute such a local copy. In both the local copy and the remote copy, data in a divided area obtained by dividing logical volumes into the same size is copied at a time.

For the local copy, a copy bitmap and a tracking bitmap are used as copy management information. The copy bitmap is management information that includes bit values respectively indicating whether the local copy is complete for the corresponding respective divided areas. A value of "1" indicates that the local copy is yet to be executed, and a value of "0" indicates that the local copy is complete. The tracking bitmap is management information that includes bit values respectively indicating whether data has been updated in the corresponding respective divided areas in response to requests from the business server 300 after the start of the local copy. A value of "0" indicates that data has not been updated, and a value of "1" indicates that data has been updated.

Figure 6:
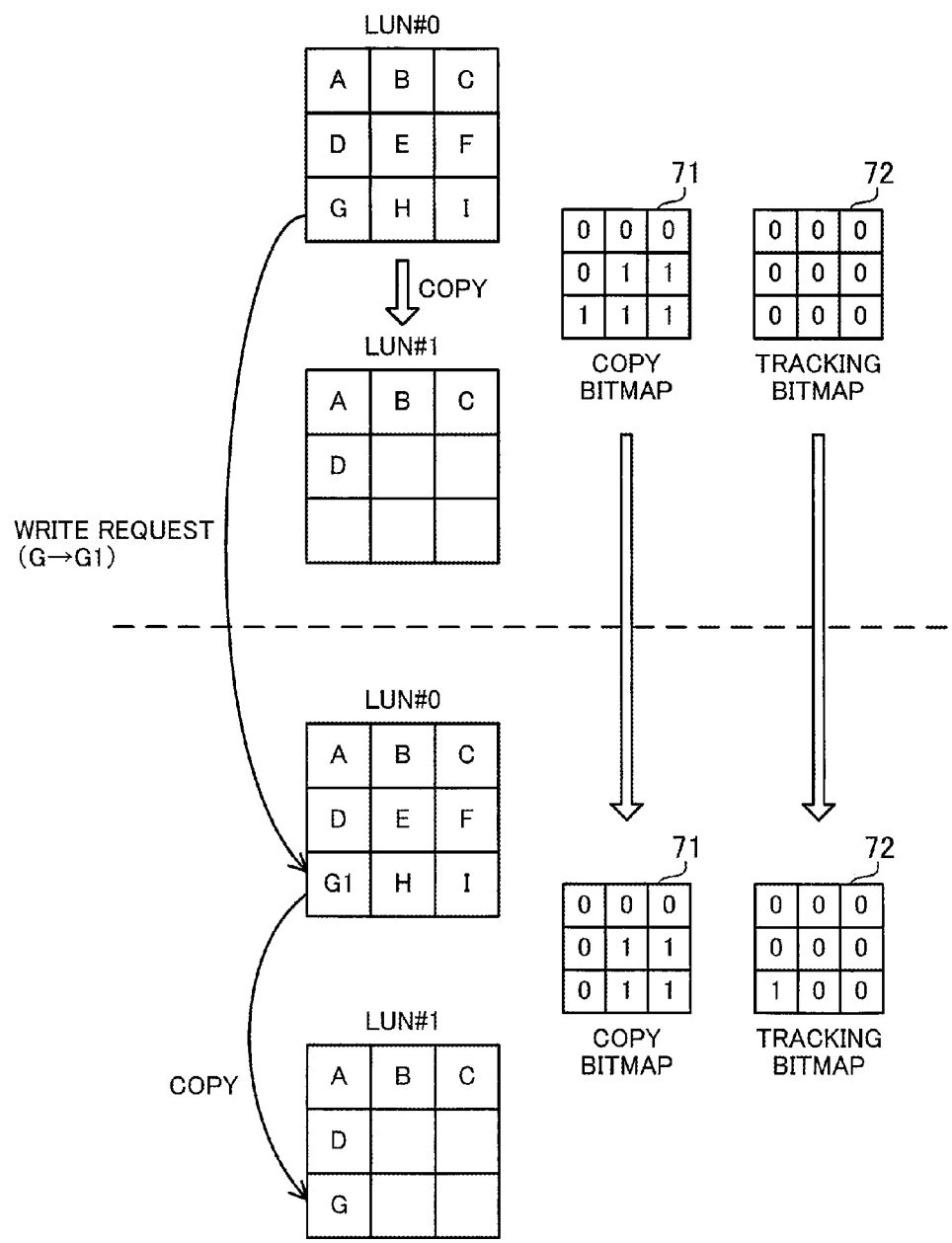
FIG. 6 illustrates an example of a local copy.

FIG. 6 illustrates an example of a local copy. When requested for the first round of a local copy from the LUN #0 to the LUN #1, the storage apparatus 100 sets all bits to "1" in a copy bitmap 71, and all bits to "0" in a tracking bitmap 72. Then, the storage apparatus 100 makes a copy from the LUN #0 to the LUN #1 for the divided areas corresponding to bits with a value of "1" in the copy bitmap 71, and then updates the bits of "1" to "0" in the copy bitmap 71.

The upper part of FIG. 6 illustrates a situation where data A to D out of data A to I stored in the divided areas of the LUN #0 has been copied to the LUN #1. Under this situation, it is assumed that a request for updating the data G to data G1 in the LUN #0 is issued from the business server 300. In this case, as illustrated in the lower part of FIG. 6, the storage apparatus 100 copies the current data G from the LUN #0 to the LUN #1, and then updates the data G to the new data G1 in the LUN #0. In addition, the storage apparatus 100 updates the bit of the tracking bitmap 72 corresponding to the divided area where the data has been updated, from "0" to "1", and updates the bit of the copy bitmap 71 corresponding to that divided area from "1" to "0". This approach makes it possible to make a backup of data stored at the time of issuance of a request for a local copy to the copy destination LUN #1, without fail and without interrupting access to the LUN #0 from the business server 300.

In addition, even after a local copy is completed by copying data in the divided areas corresponding to all bits with a value of "1" in the copy bitmap 71 from the LUN #0 to the LUN #1, the storage apparatus 100 updates data in a specified divided area of the LUN #0 in response to a request from the business server 300 and then updates a bit of the tracking bitmap 72 corresponding to the divided area from "0" to "1", which is not illustrated. After that, when requested for a local copy again, the storage apparatus 100 copies all bit values of the tracking bitmap 72 to the copy bitmap 71, and then updates all bits of the tracking bitmap 72 to "0". After that, the storage apparatus 100 locally copies data from the LUN #0 to the LUN #1. At this time, the storage apparatus 100 copies data in only the divided areas corresponding to bits with a value of "1" in the copy bitmap 71 from the LUN #0 to the LUN #1. By doing so, data in only divided areas which have been updated once or more times since the local copy was requested last time is copied from the LUN #0 to LUN #1. That is to say, a "differential copy" from the LUN #0 to the LUN #1 is executed, which reduces a time to be taken for the local copy.

Figure 7:
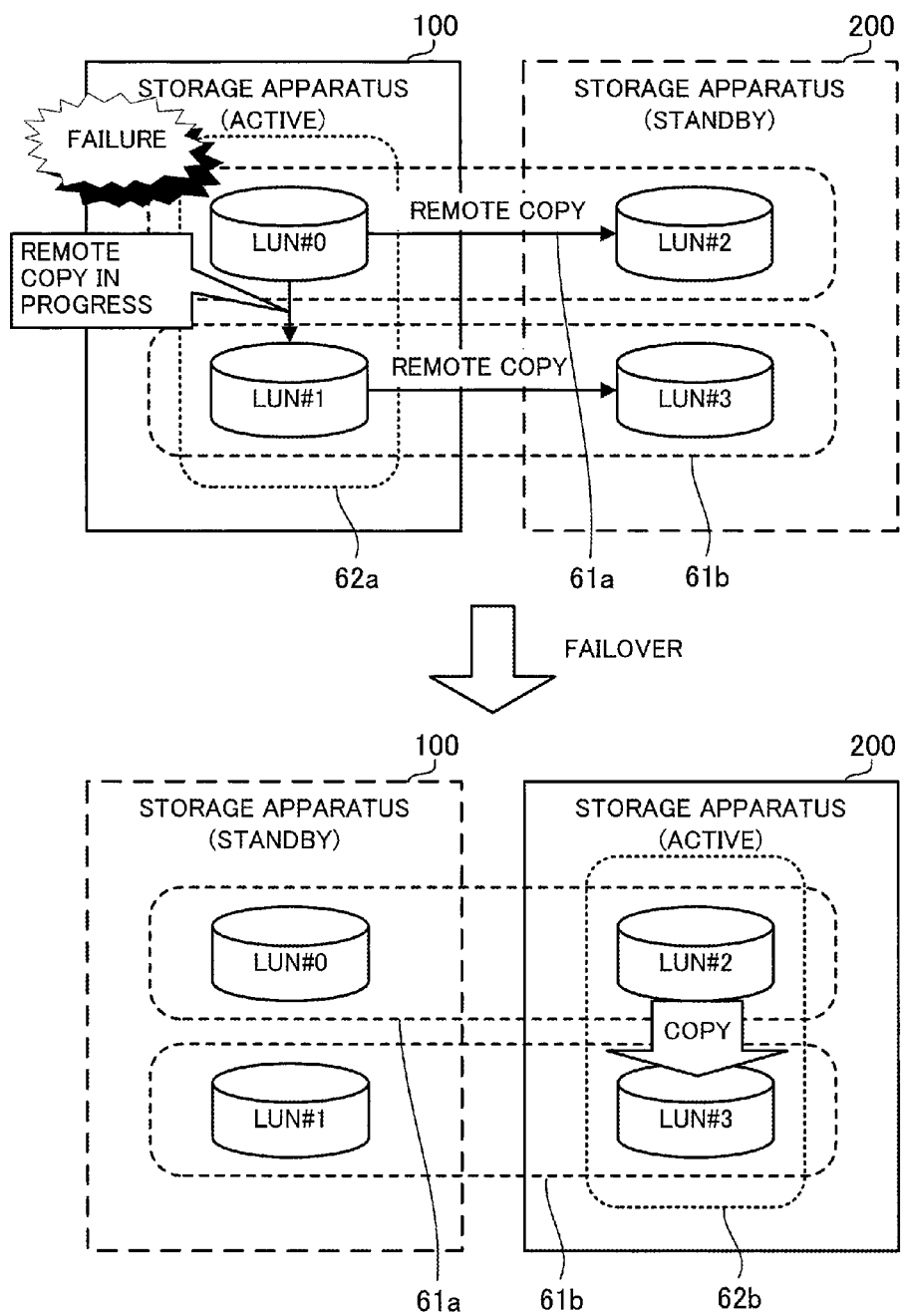
FIG. 7 is a view for explaining problems that arise when a failover occurs.

FIG. 7 is a view for explaining problems that arise when a failover occurs. A failover occurs when the storage apparatus 100 stops its operation due to a failure in a configuration where a remote copy and a local copy are executed as illustrated in FIG. 5. Thereby, the storage apparatus 200 gets into active state, so that a logical volume to be accessed from the business server 300 is changed from the LUN #0 to the LUN #2.

However, as illustrated in the upper part of FIG. 7, the storage apparatus 200 in standby state does not execute a local copy from the LUN #2 to the LUN #3 before the failover. Therefore, in order to enable the storage apparatus 200 to locally copy data from the LUN #2 to the LUN #3 after the failover, as illustrated in the lower part of FIG. 7, the administrator needs to make some settings for executing the local copy, such as registration of a local copy pair 62b. Therefore, there arises a problem that is a low efficiency of the administrator's backup management work.

In addition, for example, if a failover occurs while the storage apparatus 100 executes a local copy, the storage apparatus 200 is not able to recognize the progress of the local copy. Therefore, it is not possible for the storage apparatus 200 to take over the local copy halfway through.

Furthermore, if a failover occurs after the storage apparatus 100 completes a local copy, the storage apparatus 200 is not able to recognize which divided area in the LUN #0 has data updated after the start of the most recent local copy. Therefore, the storage apparatus 200 is not able to execute a differential copy from the LUN #2 to the LUN #3, and therefore all data in the LUN #2 needs to be copied to the LUN #3 again.

Figure 8:
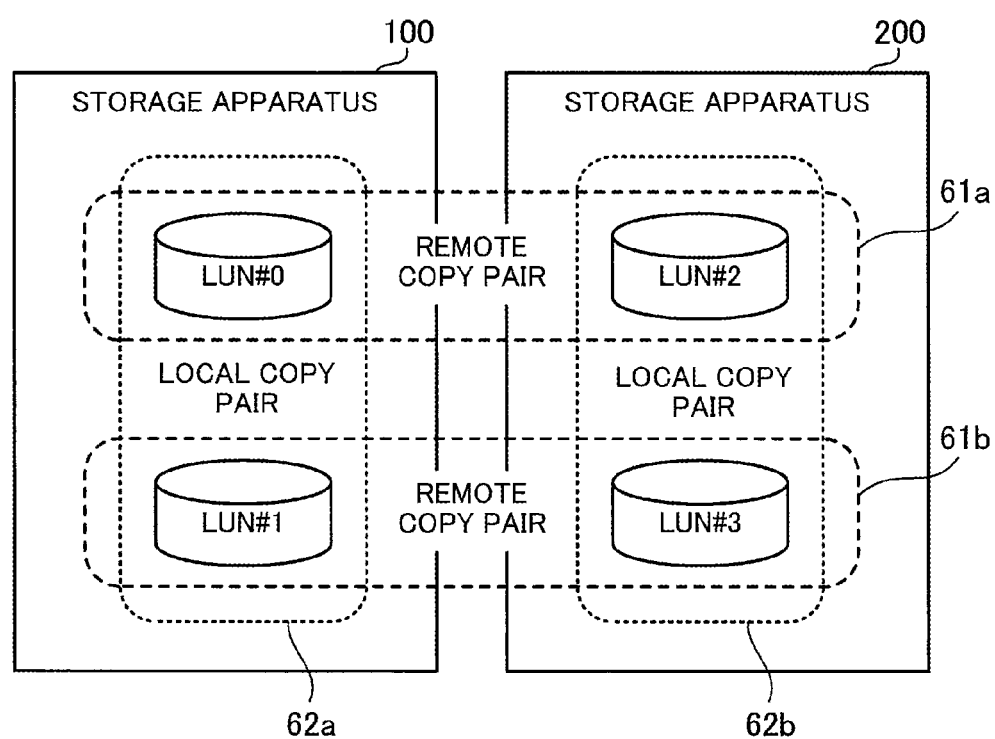
FIG. 8 is a view for explaining the registration of local copy pairs according to the second embodiment.
Figure 9:
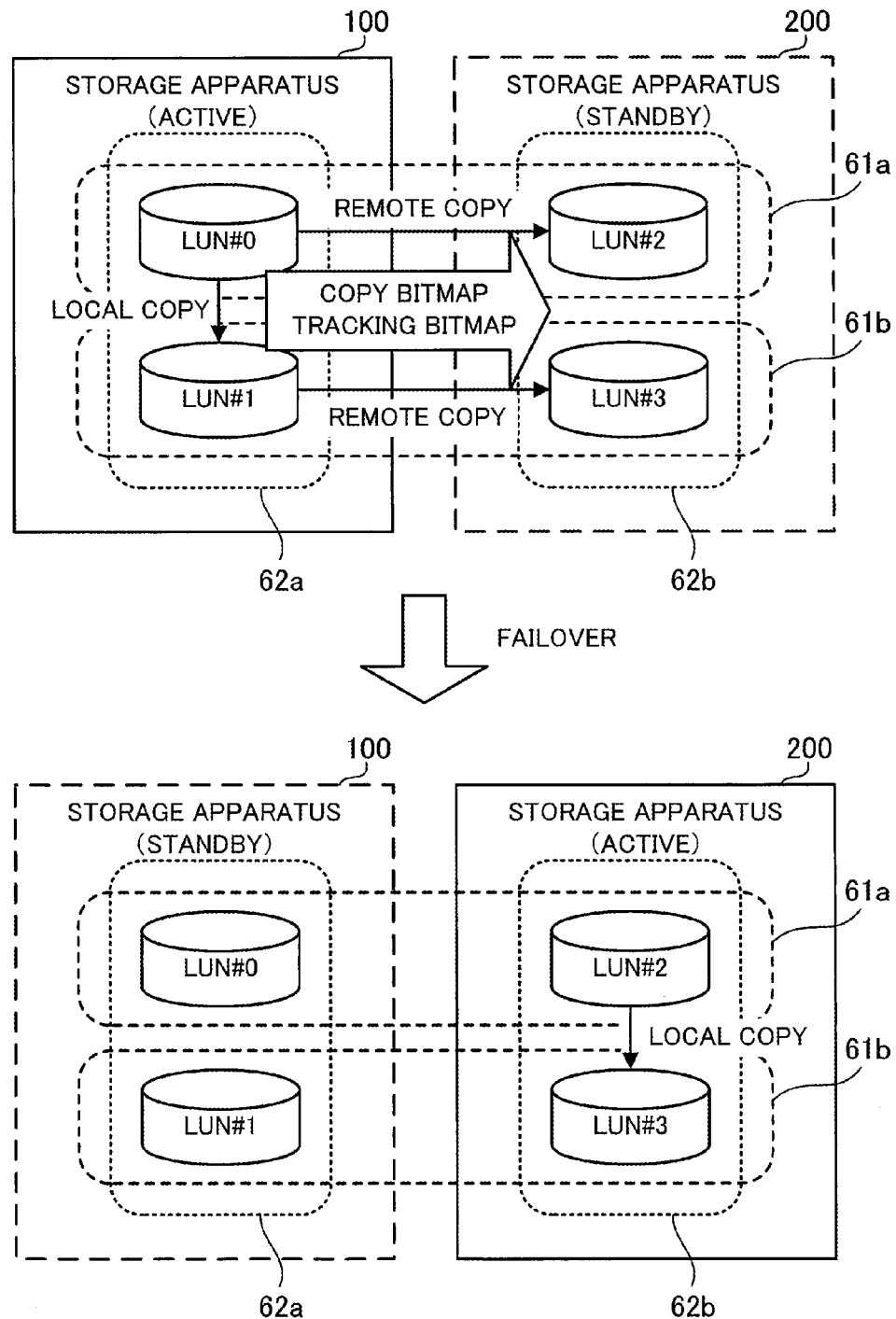
FIG. 9 is a view for explaining how to perform copy processes according to the second embodiment.

To deal with these problems, the second embodiment performs the following processes as illustrated in FIGS. 8 and 9.

FIG. 8 is a view for explaining the registration of local copy pairs according to the second embodiment. In this embodiment, local copy pairs are registered in advance in both the storage apparatuses 100 and 200. More specifically, the LUN #0 and the LUN #1 in the storage apparatus 100 are registered as a local copy pair 62a, and the LUN #2 and the LUN #3 in the storage apparatus 200 are registered as a local copy pair 62b. Note that a local copy based on a local copy pair is executed in only a storage apparatus in active state.

FIG. 9 is a view for explaining how to perform copy processes according to the second embodiment. The upper part of FIG. 9 illustrates a situation where the storage apparatus 100 is in active state, by way of example. Under this situation, the storage apparatus 100 executes a local copy from the LUN #0 to the LUN #1 on the basis of the registered local copy pair 62a. Whereas, the storage apparatus 200 in standby state does not execute a local copy from the LUN #2 to the LUN #3 based on the registered local copy pair 62b.

In addition, a remote copy from the LUN #0 to the LUN #2 based on the registered remote copy pair 61a and a remote copy from the LUN #1 to the LUN #3 based on the registered remote copy pair 61b are executed. In conjunction with this, a copy bitmap and tracking bitmap for the local copy from the LUN #0 to the LUN #1 are remotely copied from the storage apparatus 100 to the storage apparatus 200, so that these maps are synchronized between the storage apparatuses 100 and 200.

When a failover occurs, the storage apparatus 200 gets into active state, and validates the registration of the local copy pair 62b accordingly, as illustrated in the lower part of FIG. 9. That is to say, the storage apparatus 200 comes to be able to execute a local copy from the LUN #2 to the LUN #3 upon receipt of a local copy request, without the local copy pair 62b being set by the administrator. This improves the efficiency of the administrator's data backup management work.

In addition, after a failover occurs, the storage apparatus 200 is able to refer to the copy bitmap and tracking bitmap obtained with a remote copy from the storage apparatus 100 before the failover. Therefore, even if a failover occurs while the storage apparatus 100 executes a local copy from the LUN #0 to the LUN #1, the storage apparatus 200 is able to copy data from only divided areas for which a copy is yet to be executed in the LUN #2, to the LUN #3, with reference to the copy bitmap obtained with the remote copy. That is to say, the storage apparatus 200 is able to take over the local copy halfway through, without fail.

Even when a failover occurs after the storage apparatus 100 completes a local copy from the LUN #0 to the LUN #1, the storage apparatus 200 is able to take over the management for the divided areas where data has been updated in the LUN #2 with reference to the tracking bitmap obtained with the remote copy. Therefore, the storage apparatus 200 is able to execute a differential copy without fail in a subsequent local copy process.

Figure 10:
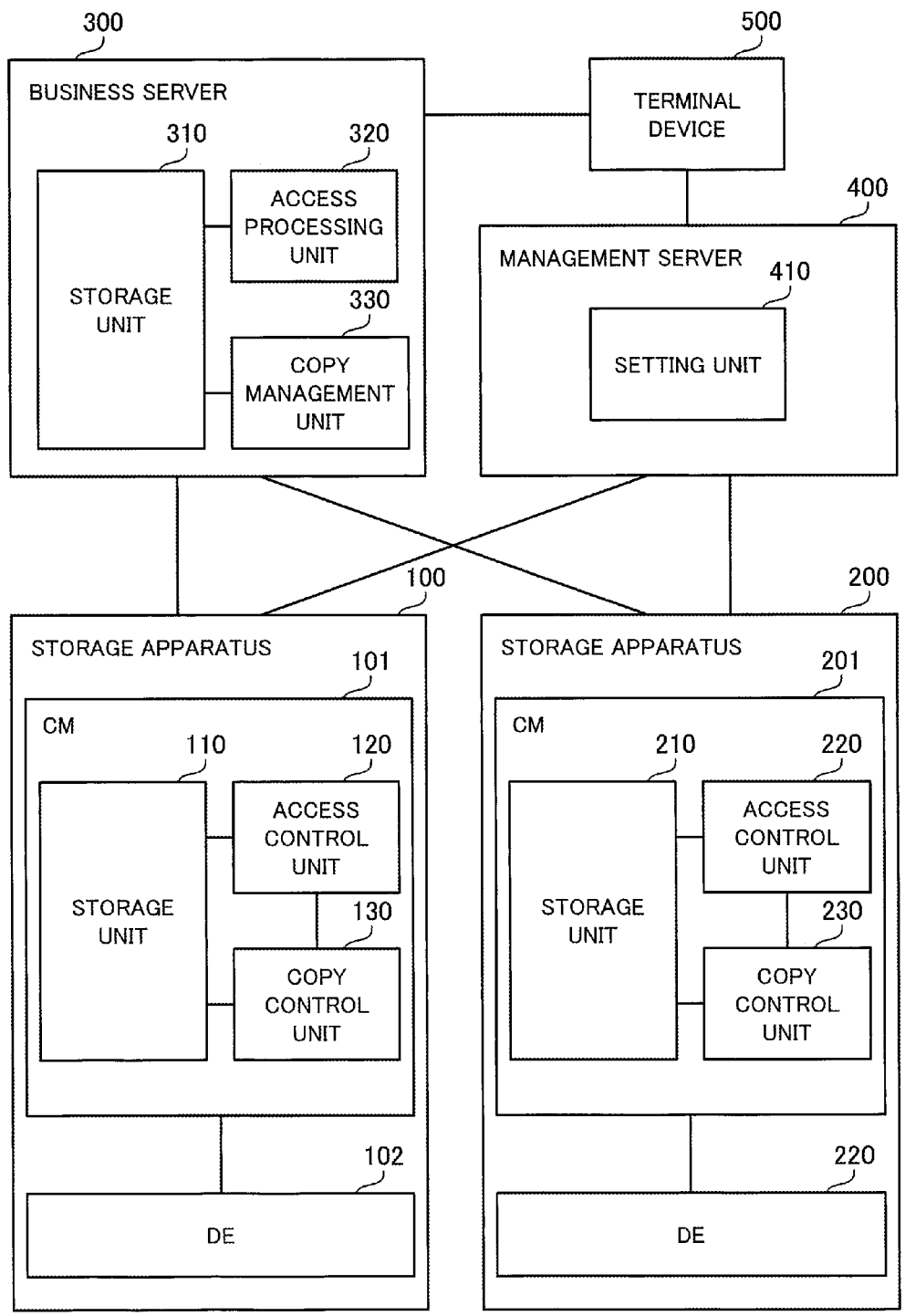
FIG. 10 is a block diagram illustrating an exemplary configuration of processing functions within the storage system.

FIG. 10 is a block diagram illustrating an exemplary configuration of processing functions within the storage system.

The controller module 101 of the storage apparatus 100 includes a storage unit 110, an access control unit 120, and a copy control unit 130. The storage unit 110 is implemented by using a storage area of the RAM 104 or SSD 105 of the controller module 101, for example. The processing performed by the access control unit 120 and copy control unit 130 is implemented by the processor 103 of the controller module 101 executing prescribed programs.

The storage unit 110 stores a variety of setting information, which includes information about local copy pairs and information about remote copy pairs.

While the storage apparatus 100 is in active state, the access control unit 120 receives an access request for access to the LUN #0 from the business server 300, and performs an access control process for the access request.

While the storage apparatus 100 is in active state, the copy control unit 130 executes a local copy from the LUN #0 to the LUN #1 and a data transmission process from the LUN #0 and LUN #1 to the controller module 201 on the basis of remote copy pair information. In addition, while the storage apparatus 100 is in standby state, the copy control unit 130 performs a process of updating the LUN #0 using data of the LUN #2 received from the storage apparatus 200 and a process of updating the LUN #1 using data of LUN #3 received from the storage apparatus 200.

The controller module 201 of the storage apparatus 200 includes a storage unit 210, an access control unit 220, and a copy control unit 230. The storage unit 210 is implemented by using a storage area of the RAM or SSD of the controller module 201, for example. The processing performed by the access control unit 220 and copy control unit 230 is implemented by a processor of the controller module 201 executing prescribed programs.

The storage unit 210 stores a variety of setting information, which includes information about local copy pairs and information about remote copy pairs.

While the storage apparatus 200 is in active state, the access control unit 220 receives an access request for access to the LUN #2 from the business server 300, and performs an access control process for the access request.

While the storage apparatus 200 is in active state, the copy control unit 230 executes a local copy from the LUN #2 to the LUN #3 and a data transmission process from the LUN #2 and LUN #3 to the controller module 101 on the basis of remote copy pair information. In addition, while the storage apparatus 200 is in standby state, the copy control unit 230 performs a process of updating the LUN #2 using data of the LUN #0 received from the storage apparatus 100 and a process of updating the LUN #3 using data of LUN #1 received from the storage apparatus 100.

The business server 300 includes a storage unit 310, an access processing unit 320, and a copy management unit 330. The storage unit 310 is implemented by using a storage area of the RAM 302 or HDD 303 of the business server 300, for example. The processing performed by the access processing unit 320 and the copy management unit 330 is implemented by the processor 301 of the business server 300 executing prescribed programs, for example.

The storage unit 310 stores a variety of information that is referenced by the access processing unit 320 and copy management unit 330. The access processing unit 320 accesses the LUN #0 of the storage apparatus 100 or the LUN #2 of the storage apparatus 200. The copy management unit 330 requests a storage apparatus in active state, out of the storage apparatuses 100 and 200, to execute a local copy in response to a copy request from the terminal device 500.

The management server 400 includes a setting unit 410. The processing performed by the setting unit 410 is implemented by a processor of the management server 400 executing prescribed programs, for example. The setting unit 410 sets a variety of information for operating the storage apparatuses 100 and 200, in the storage apparatuses 100 and 200 and business server 300 in response to requests from the terminal device 500.

Figure 11:
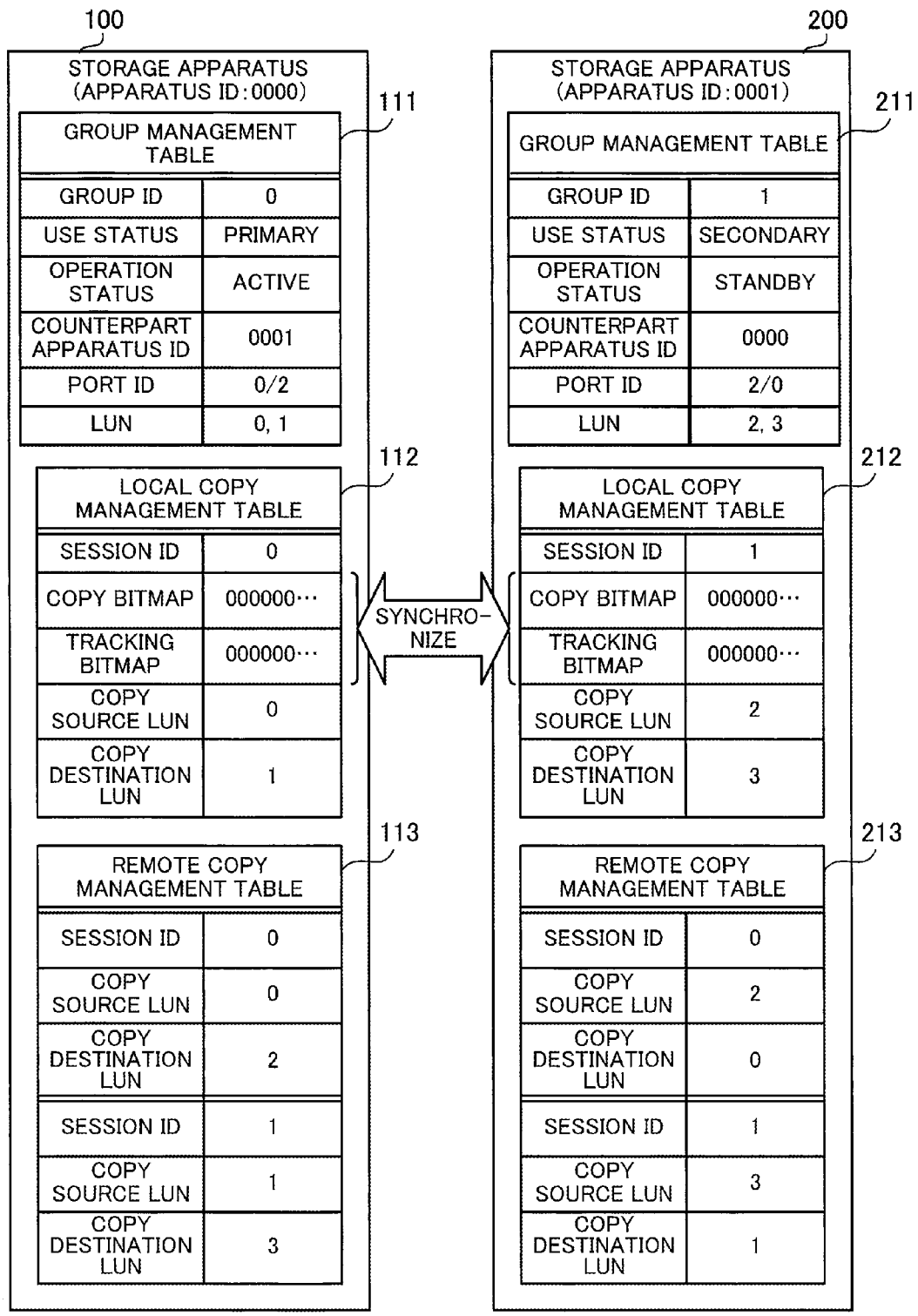
FIG. 11 illustrates an example of information that is set in storage apparatuses.

FIG. 11 illustrates an example of information that is set in storage apparatuses. The storage unit 110 of the controller module 101 of the storage apparatus 100 stores a group management table 111, a local copy management table 112, and a remote copy management table 113. The storage unit 210 of the controller module 201 of the storage apparatus 200 stores a group management table 211, a local copy management table 212, and a remote copy management table 213.

The group management table 111 contains information on a group to which the storage apparatus 100 belongs. The group management table 211 contains information on a group to which the storage apparatus 200 belongs. These group management tables 111 and 211 each include the following fields: "Group ID," "Use Status," "Operation Status," "Counterpart Apparatus ID," "Port ID," and "LUN."

The "Group ID" field contains the identification number of a group. The "Use Status" field contains information indicating whether a corresponding storage apparatus is primary or secondary. The "Operation Status" field contains information indicating whether the corresponding storage apparatus is in active state or in standby state.

The "Counterpart Apparatus ID" field contains the identification number of a counterpart storage apparatus, which is clustered as a pair together with the corresponding storage apparatus. The "Port ID" field contains the identification number of a communication destination channel adapter to be used when the corresponding storage apparatus is in active state and the identification number of a communication destination channel adapter (that is, the channel adapter of the counterpart storage apparatus) to be used when the corresponding storage apparatus is in standby state. The "LUN" field contains the identification numbers of logical volumes that are configured in the corresponding storage apparatus and that belong to the group.

In the group management tables 111 and 211, the clustering of storage apparatuses is registered by registering the identification numbers of each other's counterpart storage apparatuses in the "Counterpart Apparatus ID" field. In addition, each logical volume registered in the "LUN" field is taken as a logical volume for which a remote copy is executed with a logical volume of the counterpart storage apparatus.

The local copy management table 112 contains setting information about a local copy that is executed in the storage apparatus 100. The local copy management table 212 contains setting information about a local copy that is executed in the storage apparatus 200. The local copy management tables 112 and 212 each include the following fields: "Session ID," "Copy Bitmap," "Tracking Bitmap," "Copy Source LUN," and "Copy Destination LUN."

The "Session ID" field contains an identification number identifying a local copy process. The "Copy Bitmap" field contains a copy bitmap to be used in the local copy. The "Tracking Bitmap" field contains a tracking bitmap to be used in the local copy. The "Copy Source LUN" field contains the identification number of the local copy source logical volume. The "Copy Destination LUN" field contains the identification number of the local copy destination logical volume. The logical volumes registered in the "Copy Source LUN" and "Copy Destination LUN" fields are those registered in the "LUN" field of the group management table 111, 211.

A local copy based on the information registered in the local copy management table 112, 212 is executed only when the corresponding storage apparatus is in active state. In addition, the copy bitmap and tracking bitmap in the local copy management table within the storage apparatus in active state are remotely copied to the "Copy Bitmap" and "Tracking Bitmap" fields of the local copy management table in the counterpart storage apparatus. Thereby, the copy bitmap and tracking bitmap are synchronized between these storage apparatuses.

The remote copy management table 113 contains setting information about a remote copy that is executed in the storage apparatus 100. The remote copy management table 213 contains setting information about a remote copy that is performed in the storage apparatus 200. Each record of the remote copy management tables 113 and 213 includes the following fields: "Session ID," "Copy Source LUN," and "Copy Destination LUN."

The "Session ID" field contains an identification number identifying a remote copy process. The "Copy Source LUN" field contains the identification number of a remote copy source logical volume. The "Copy Destination LUN" field contains the identification number of a remote copy destination logical volume that is registered in the counterpart storage apparatus.

In this embodiment, each of the remote copy management tables 113 and 213 has two records. In addition, a remote copy based on the information registered in a remote copy management table is executed only when the corresponding storage apparatus is in active state.

Figure 12:
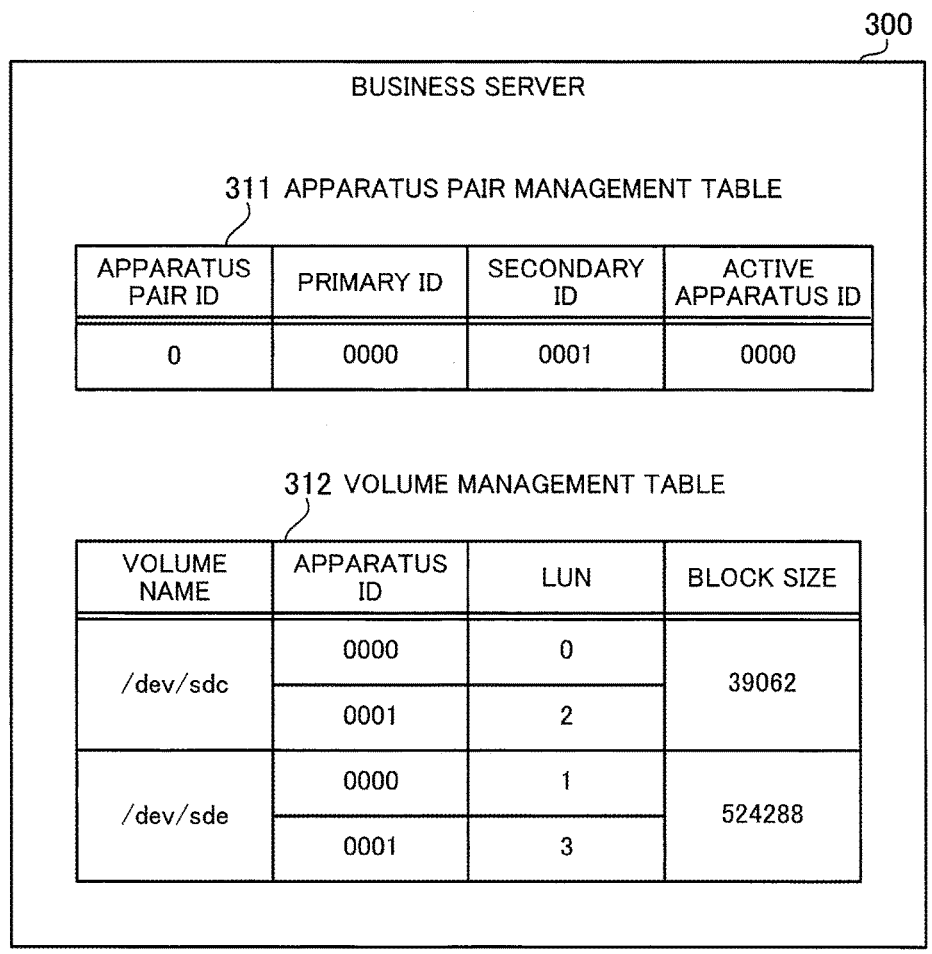
FIG. 12 illustrates an example of information that is set in the business server.

FIG. 12 illustrates an example of information that is set in the business server. The storage unit 310 of the business server 300 stores therein an apparatus pair management table 311 and a volume management table 312.

The apparatus pair management table 311 contains information about a pair of clustered storage apparatuses, and includes the following fields: "Apparatus Pair ID," "Primary ID," "Secondary ID," and "Active Apparatus ID."

The "Apparatus Pair ID" field contains a number identifying a pair of clustered storage apparatuses. The "Primary ID" field contains the identification number of a primary storage apparatus. The "Secondary ID" field contains the identification number of a secondary storage apparatus. The "Active Apparatus ID" field contains the identification number of a storage apparatus in active state out of the clustered storage apparatuses.

The volume management table 312 contains information about a logical volume that is accessible from the business server 300, and includes the following fields: "Volume Name," "Apparatus ID," "LUN," and "Block Size."

The "Volume Name" field contains the identification information of a volume implemented by the OS of the business server 300. The "Apparatus ID" field contains the identification number of a storage apparatus. The "LUN" field contains the identification number of a logical volume. The "Block Size" field contains the size of a logical volume.

In the volume management table 312, an apparatus ID and a LUN are registered for each of the primary and secondary devices with respect to one volume name. This enables the business server 300 to recognize the identification number (LUN) of an access destination logical volume in an active one of the primary and secondary storage apparatuses.

The following describes how the storage system of this embodiment operates, with reference to sequence diagrams.

Figure 13:
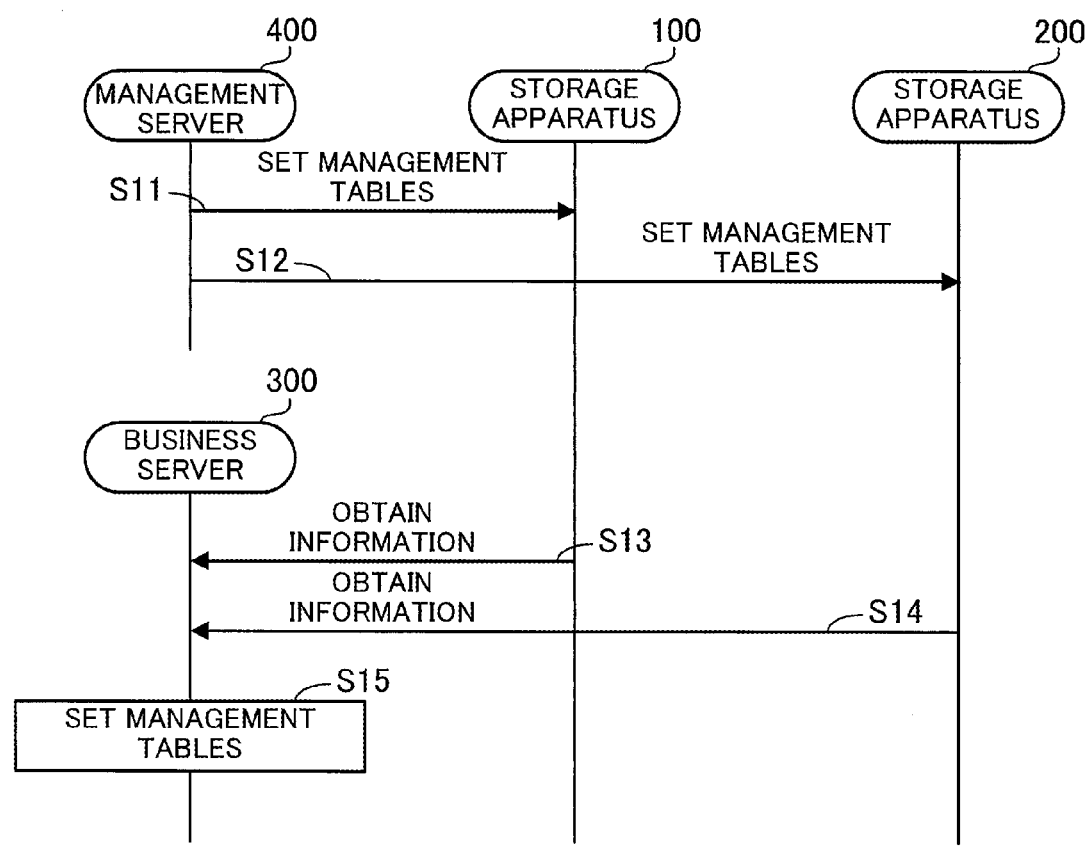
FIG. 13 is a sequence diagram illustrating an exemplary setting process that is performed on storage apparatuses.

FIG. 13 is a sequence diagram illustrating an exemplary setting process that is performed on storage apparatuses.

First, a setting process for the storage apparatuses 100 and 200 is performed by the management server 400 in accordance with administrator's inputs made on the terminal device 500.

(Step S11) The setting unit 410 of the management server 400 sets the group management table 111, local copy management table 112, and remote copy management table 113 in the controller module 101 of the storage apparatus 100.

(Step S12) The setting unit 410 sets the group management table 211, local copy management table 212, and remote copy management table 213 in the controller module 201 of the storage apparatus 200.

In this connection, the setting process of steps S11 and S12 may be performed on the storage apparatuses 100 and 200 by the business server 300.

Then, a setting process for the business server 300 is performed in accordance with administrator's inputs made on the terminal device 500.

(Step S13) The business server 300 obtains information registered in the group management table 111, local copy management table 112, and remote copy management table 113 from the storage apparatus 100.

(Step S14) The business server 300 obtains information registered in the group management table 211, local copy management table 212, and remote copy management table 213 from the storage apparatus 200.

(Step S15) The business server 300 sets the apparatus pair management table 311 and volume management table 312 on the basis of the information obtained at steps S13 and S14.

Figure 14:
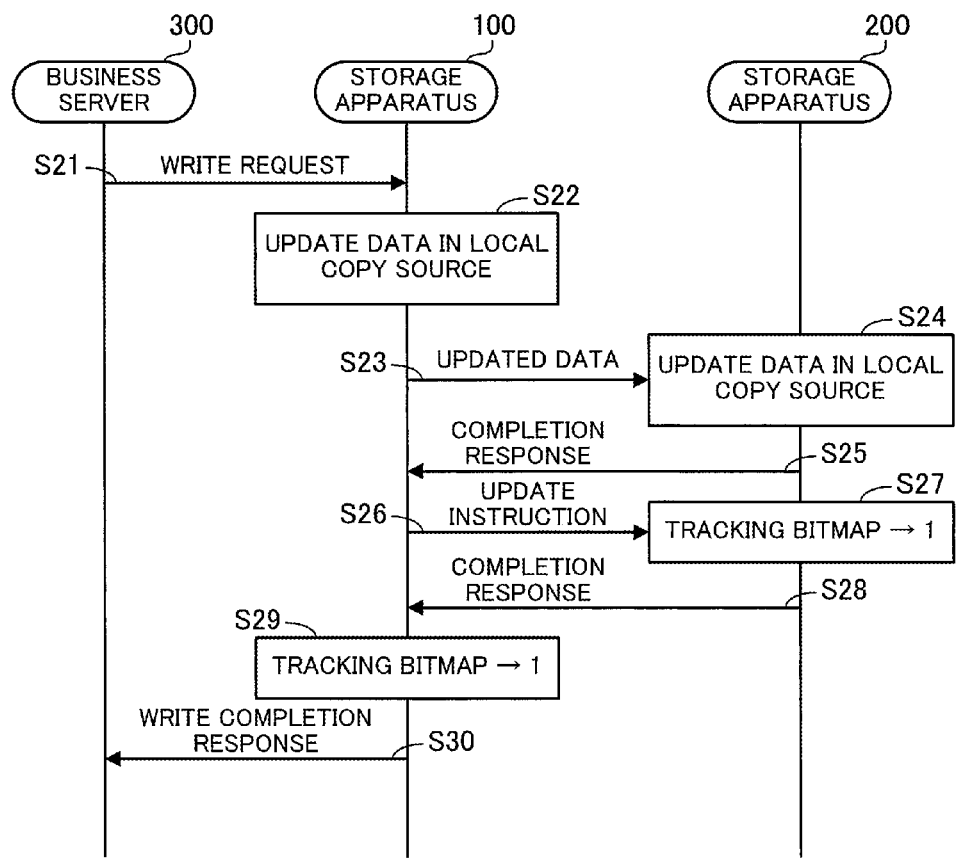
FIG. 14 is a sequence diagram illustrating an exemplary process that is performed when a write request to a storage apparatus is issued from the business server.

FIG. 14 is a sequence diagram illustrating an exemplary process that is performed when a write request to a storage apparatus is issued from the business server. In FIG. 14, it is assumed that the storage apparatus 100 is in active state and the storage apparatus 200 is in standby state, by way of example.

(Step S21) The access processing unit 320 of the business server 300 sends the storage apparatus 100 a write request for writing data to the LUN #0 of the storage apparatus 100.

(Step S22) The access control unit 120 of the storage apparatus 100 updates data specified by the write request in the LUN #0 (local copy source logical volume) to the write data received from the business server 300.

(Step S23) The copy control unit 130 of the storage apparatus 100 sends the data updated at step S22 to the storage apparatus 200 to request a remote copy to the LUN #2.

(Step S24) The copy control unit 230 of the storage apparatus 200 updates the corresponding data in the LUN #2 (local copy source logical volume) to the data received from the storage apparatus 100.

(Step S25) The copy control unit 230 sends the storage apparatus 100 a response indicating completion of the remote copy.

(Step S26) The copy control unit 130 of the storage apparatus 100 requests the storage apparatus 200 to update a bit of the tracking bitmap corresponding to the divided area where the data was updated at step S24, to "1".

(Step S27) The copy control unit 230 of the storage apparatus 200 updates the corresponding bit of the tracking bitmap to "1".

(Step S28) The copy control unit 230 sends the storage apparatus 100 a response indicating completion of the update of the tracking bit.

(Step S29) The copy control unit 130 of the storage apparatus 100 updates a bit of the tracking bitmap corresponding to the divided area where the data was updated at step S22, to "1".

(Step S30) The access control unit 120 of the storage apparatus 100 sends the business server 300 a response indicating completion of the data write.

Figure 15:
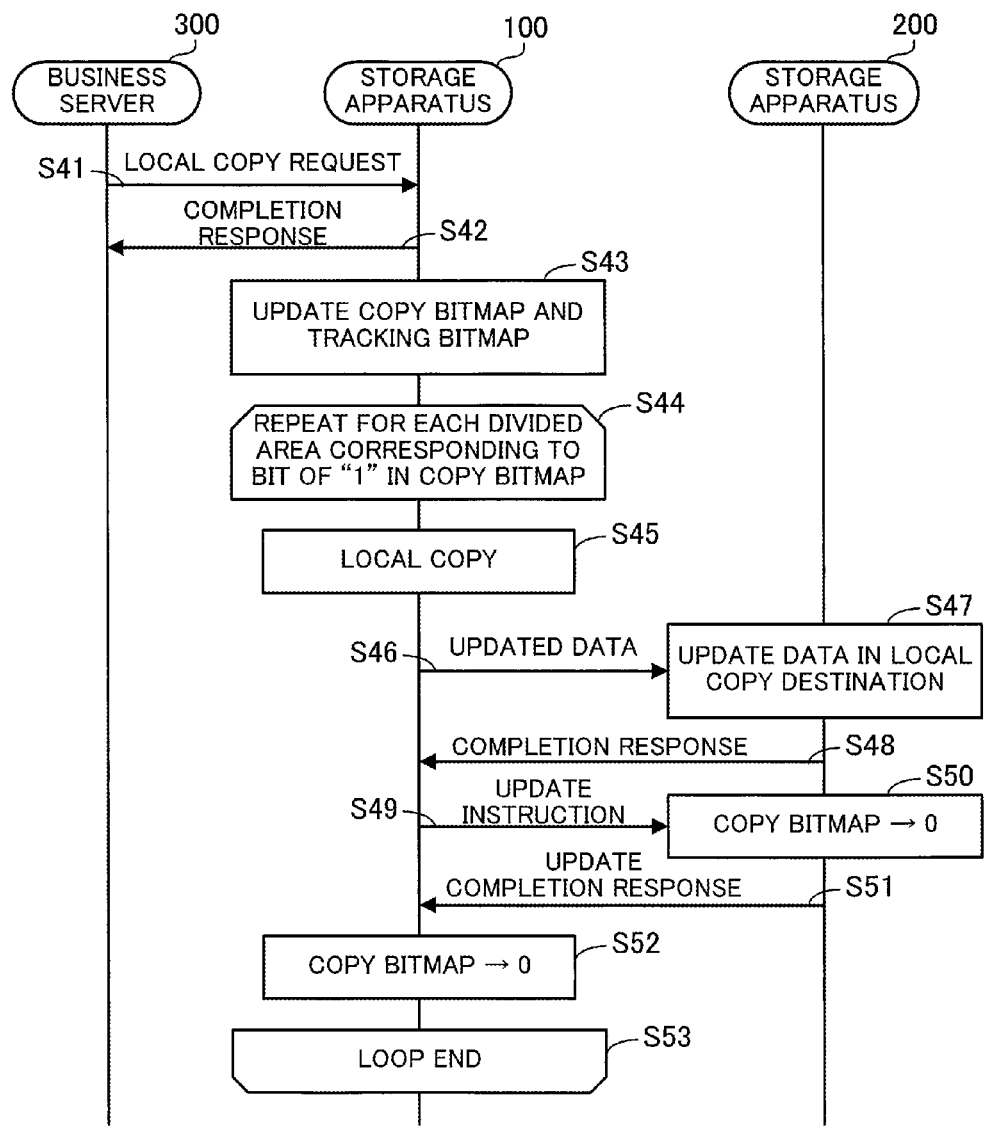
FIG. 15 is a sequence diagram illustrating an exemplary process that is performed when a local copy is requested.

FIG. 15 is a sequence diagram illustrating an exemplary process that is performed when a local copy is requested. In FIG. 15, it is assumed that the storage apparatus 100 is in active state and the storage apparatus 200 is in standby state, by way of example.

(Step S41) The administrator operates the terminal device 500 to instruct the business server 300 to execute a local copy. The instructed business server 300 requests the storage apparatus 100 in active state to execute a local copy. The execution of the local copy may be instructed by the management server 400, for example.

(Step S42) The copy control unit 130 of the storage apparatus 100 sends the business server 300 a response indicating completion of the local copy.

(Step S43) The copy control unit 130 of the storage apparatus 100 updates all bits of the copy bitmap to the values of corresponding bits of the tracking bitmap. Then, the copy control unit 130 updates all bits of the tracking bitmap to "0."

(Step S44) A process up to the loop end at step S53 is repeated for each divided area corresponding to a bit value of "1" in the copy bitmap.

(Step S45) The copy control unit 130 locally copies data from the divided area of attention in the LUN #0 to the corresponding divided area of the LUN #1.

(Step S46) The copy control unit 130 sends the updated data, which updated the LUN #1 at step S45, to the storage apparatus 200 to make a request for a remote copy to the LUN #3.

(Step S47) The copy control unit 230 of the storage apparatus 200 updates the data in the corresponding divided area in the LUN #3 (local copy destination logical volume) to the data received from the storage apparatus 100.

(Step S48) The copy control unit 230 sends the storage apparatus 100 a response indicating completion of the remote copy.

(Step S49) The copy control unit 130 of the storage apparatus 100 requests the storage apparatus 200 to update a bit of the copy bitmap corresponding to the divided area where the data was updated at step S47, to "0".

(Step S50) The copy control unit 230 of the storage apparatus 200 updates the corresponding bit of the copy bitmap to "0".

(Step S51) The copy control unit 230 sends the storage apparatus 100 a response indicating completion of the update of the copy bitmap.

(Step S52) The copy control unit 130 of the storage apparatus 100 updates a bit of the copy bitmap corresponding to the divided area where the data was updated at step S45, to "0".

(Step S53) The local copy process is completed when the process is completed for all divided areas corresponding to the bits of "1" in the copy bitmap.

Figure 16:
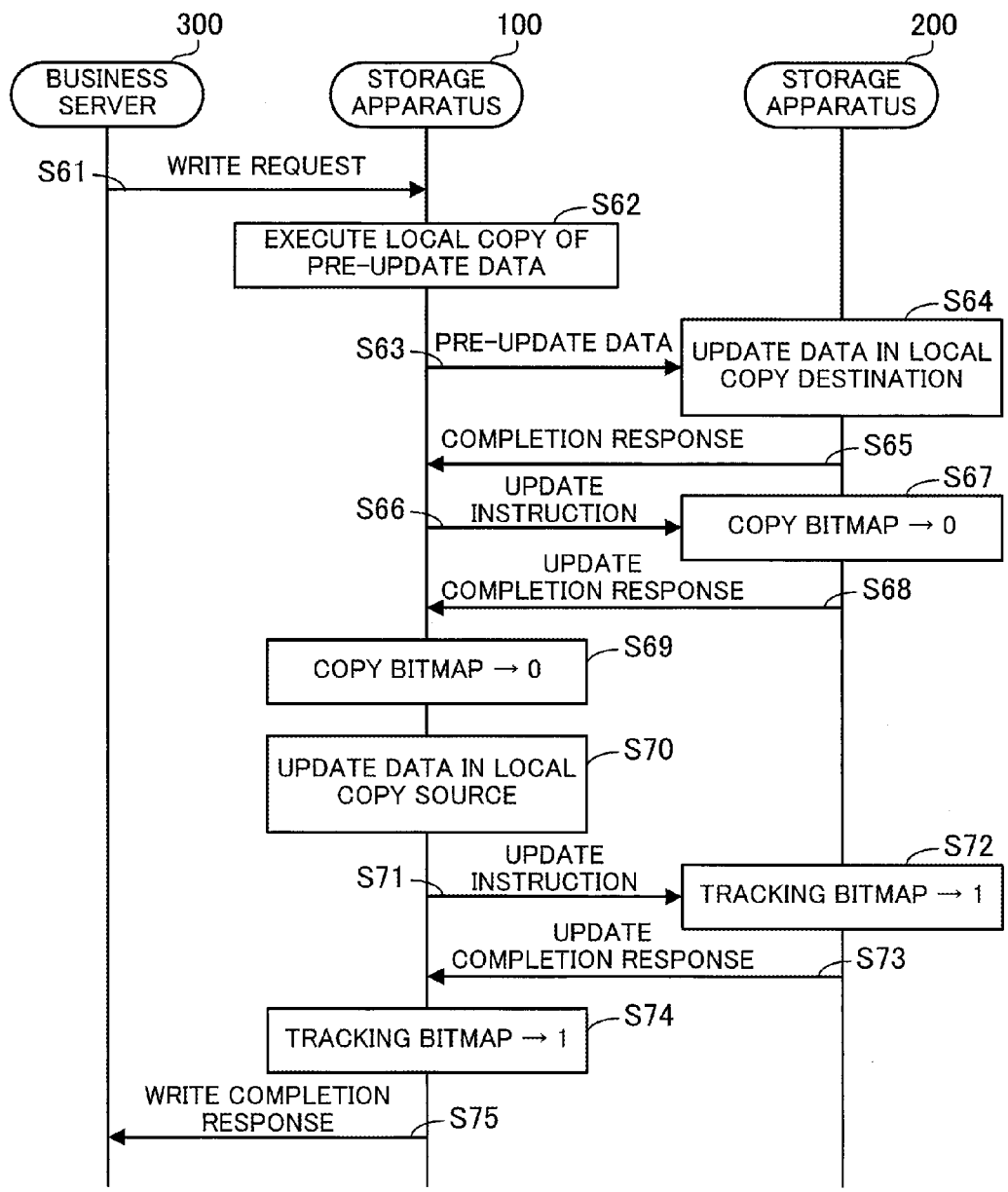
FIG. 16 illustrates an exemplary process that is performed when a data update is requested in the course of a local copy.

FIG. 16 illustrates an exemplary process that is performed when a data update is requested in the course of a local copy. In FIG. 16, it is assumed that the storage apparatus 100 is in active state and the storage apparatus 200 is in standby state, by way of example. The process of FIG. 16 is executed by interrupting the process of FIG. 15.

(Step S61) The access processing unit 320 of the business server 300 sends the storage apparatus 100 a write request for data write to the LUN #0 of the storage apparatus 100.

(Step S62) The copy control unit 130 of the storage apparatus 100 locally copies the pre-update data currently stored in the divided area specified by the write request in the LUN #0 to the corresponding divided area of the LUN #1.

(Step S63) The copy control unit 130 sends the storage apparatus 200 the updated data, which updated the LUN #1 at step S62 (that is, the pre-update data in the LUN #0), to request a remote copy to the LUN #3.

(Step S64) The copy control unit 230 of the storage apparatus 200 updates data in the corresponding divided area of the LUN #3 (local copy destination logical volume) to the data received from the storage apparatus 100.

(Step S65) The copy control unit 230 sends the storage apparatus 100 a response indicating completion of the remote copy.

(Step S66) The copy control unit 130 of the storage apparatus 100 requests the storage apparatus 200 to update a bit of the copy bitmap corresponding to the divided area where the data was updated at step S62, to "0".

(Step S67) The copy control unit 230 of the storage apparatus 200 updates the corresponding bit of the copy bitmap to "0".

(Step S68) The copy control unit 230 sends the storage apparatus 100 a response indicating completion of the update of the copy bitmap.

(Step S69) The copy control unit 130 of the storage apparatus 100 updates a bit of the copy bitmap corresponding to the divided area where the data was updated at step S62, to "0".

(Step S70) The access control unit 120 of the storage apparatus 100 updates data specified by the write request in the LUN #0 (local copy source logical volume) to the write data received from the business server 300.

(Step S71) The copy control unit 130 of the storage apparatus 100 requests the storage apparatus 200 to update a bit of the tracking bitmap corresponding to the divided area where the data was updated at step S70, to "1."

(Step S72) The copy control unit 230 of the storage apparatus 200 updates the corresponding bit of the tracking bitmap to "1."

(Step S73) The copy control unit 230 sends the storage apparatus 100 a response indicating completion of the update of the tracking bitmap.

(Step S74) The copy control unit 130 of the storage apparatus 100 updates a bit of the tracking bitmap corresponding to the divided area where the data was updated at step S70, to "1".

(Step S75) The access control unit 120 of the storage apparatus 100 sends the business server 300 a response indicating completion of the data write.

Figure 17:
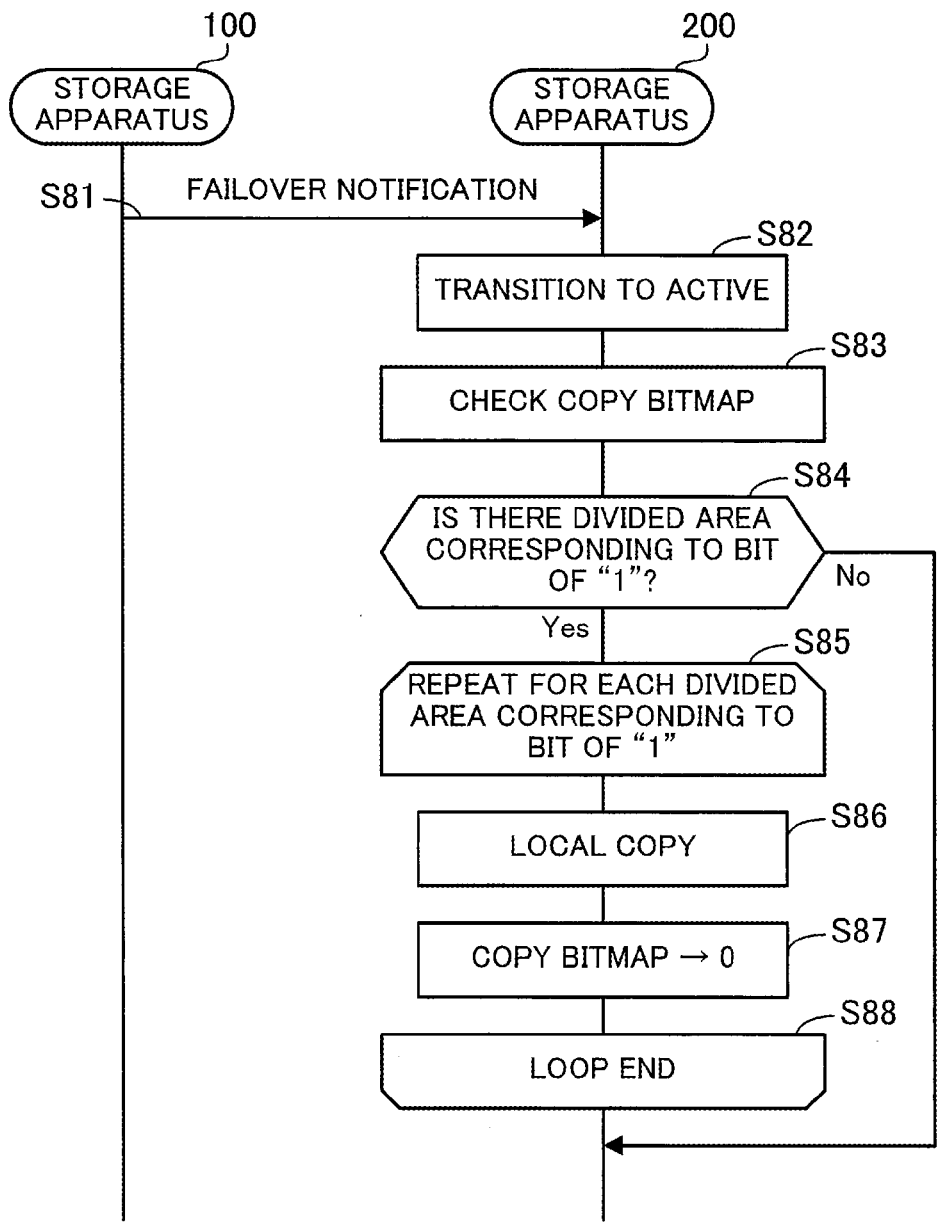
FIG. 17 is a sequence diagram illustrating an exemplary process that is performed when a failover occurs.

FIG. 17 is a sequence diagram illustrating an exemplary process that is performed when a failover occurs. FIG. 17 describes the case where a failover causes the storage apparatus 200 to transition from standby state to active state, by way of example.

(Step S81) When detecting a failure in the own storage apparatus, the storage apparatus 100 notifies the storage apparatus 200 of a failover and transitions from active state to standby state. In this connection, instead of this, the management server 400 may detect the failure in the storage apparatus 100 and notify the storage apparatus 200 of a failover.

(Step S82) The controller module 201 of the storage apparatus 200 transitions from standby state to active state in response to the failover notification. Instead of this, the storage apparatus 200 may be designed to periodically communicate with the storage apparatus 100, and when detecting a failure in the communication, transition to active state.

(Step S83) The copy control unit 230 of the storage apparatus 200 refers to the local copy management table 212 to check the value of each bit in the copy bitmap. This copy bitmap is information that was synchronized with the copy bitmap of the storage apparatus 100 until before the failover.

(Step S84) The copy control unit 230 determines whether there is a divided area corresponding to a bit of "1" in the copy bitmap. If there is such a divided area, it is determined that a failover occurred in the course of the local copy in the storage apparatus 100. In this case, the process proceeds to step S85. If there is no such a divided area, the process involved in the failover is completed.

(Step S85) The copy control unit 230 repeatedly performs a process up to the loop end of step S88 on the basis of the data registered in the local copy management table 212 for each divided area corresponding to a bit of "1".

(Step S86) The copay control unit 230 locally copies data from the divided area of attention of the LUN #2 to the corresponding divided area of the LUN #3.

(Step S87) The copy control unit 230 updates a bit of the copy bitmap corresponding to the divided area of attention to "0".

(Step S88) The local copy process is completed when the process is completed for all divided areas corresponding to the bits of "1" in the copy bitmap.

According to the above process of FIG. 17, the storage apparatus 200 that has transitioned to active state is able to execute a local copy from the LUN #2 to the LUN #3 on the basis of the data registered in the previously set local copy management table 212, without the local copy being set by the administrator. In addition, the storage apparatus 200 refers to the copy bitmap that was synchronized with the copy bitmap of the storage apparatus 100 until before the failover, so as to take over the local copy process that has been executed by the storage apparatus 100, halfway through, without fail.

In addition, when the failover occurs, the local copy management table 212 of the storage apparatus 200 already contains a tracking bitmap that was synchronized with the tracking bitmap of the storage apparatus 10 until before the failover. When receiving a write request for write to the LUN #2 from the business server 300 after the failover, the storage apparatus 200 updates the tracking bitmap as well as update data in the LUN #2, in the same way as steps S22, S29, and S30 of FIG. 14. In addition, when receiving a write request for write to the LUN #2 from the business server 300 while executing a local copy taken over from the storage apparatus 100, the storage apparatus 200 operates in the same way as steps S62, S69, S70, S74, and S75 of FIG. 16. Thereby, the tracking bitmap taken over from the storage apparatus 100 is updated.

Then, when receiving a request for a local copy of the LUN #2 from the business server 300, the copy control unit 230 of the storage apparatus 200 copies all bits of the tracking bitmap to the copy bitmap. The copy control unit 230 copies data from the LUN #2 to the LUN #3 for only divided areas corresponding to bits of "1" in the copy bitmap. This enables the storage apparatus 200 to execute a differential copy in the first execution of the local copy after the failover.

Figure 18:
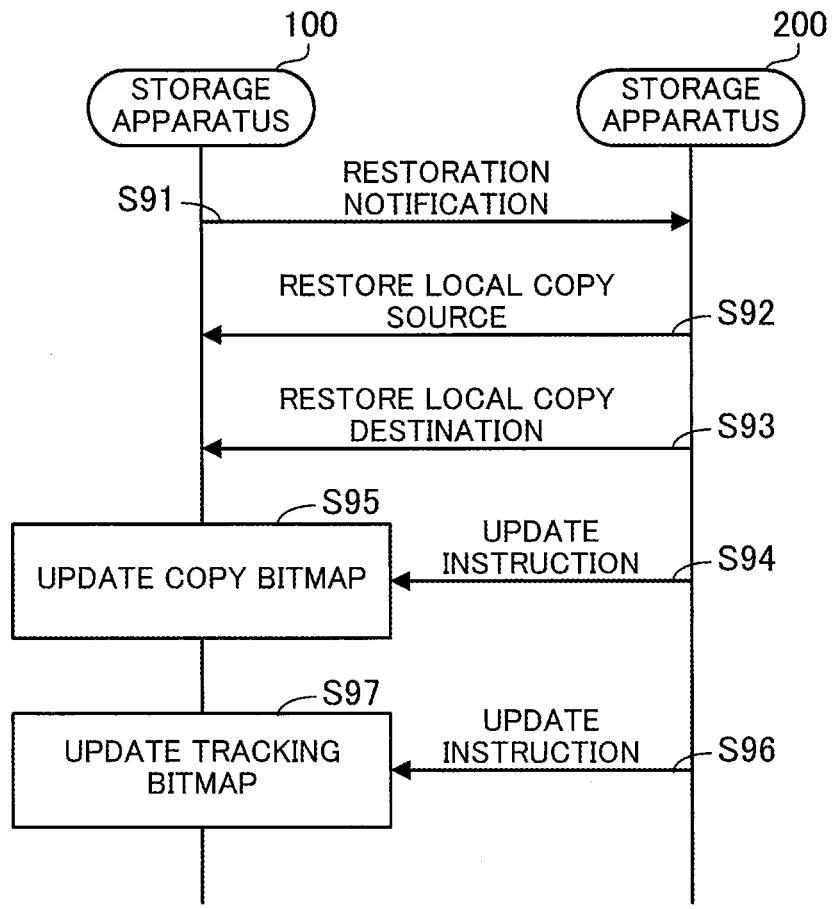
FIG. 18 is a sequence diagram illustrating an exemplary process that is performed when a storage apparatus is restored.

FIG. 18 is a sequence diagram illustrating an exemplary process that is performed when a storage apparatus is restored. FIG. 18 describes the case where the storage apparatus 100 is restored from a stopped state, by way of example. In this connection, before the following process is performed, the group management table 111, local copy management table 112, and remote copy management table 113 of the storage apparatus 100 are reset by the management server 400 performing a process according to administrator's inputs made on the terminal device 500.

(Step S91) The storage apparatus 100 notifies the storage apparatus 200 that the storage apparatus 100 has been restored.

(Step S92) The copy control unit 230 of the storage apparatus 200 sends the data stored in the LUN #2 to the storage apparatus 100 to restore the LUN #0 (that is, local copy source logical volume).

(Step S93) The copy control unit 230 sends the data stored in the LUN #3 to the storage apparatus 100 to restore the LUN #1 (that is, local copy destination logical volume).

(Step S94) The copy control unit 230 sends the copy bitmap of the local copy management table 212 to the storage apparatus 100 to instruct it to update the copy bitmap stored therein.

(Step S95) The copy control unit 130 of the storage apparatus 100 updates the copy bitmap in the local copy management table 112 using the received copy bitmap.

(Step S96) The copy control unit 230 of the storage apparatus 200 sends the tracking bitmap of the local copy management table 212 to the storage apparatus 100 to instruct it to update the tracking bitmap stored therein.

(Step S97) The copy control unit 130 of the storage apparatus 100 updates the tracking bitmap in the local copy management table 112 using the received tracking bitmap.

In the explanation for FIG. 18, a completion response for steps S92 to S94 and S96 from the storage apparatus 100 is omitted. In addition, steps S92 and 93 may be executed in a reverse order, and so are steps S94 and 96.

Exemplary Variation of Second Embodiment

The following describes an exemplary variation of the storage system of the second embodiment with part of its processing modified.

There are some reasons that a connection between a storage apparatus in active state and a storage apparatus in standby state is disconnected. For example, one of the reasons may be that the storage apparatus in standby state stops due to a failure. Another reason may be that a failover occurs because the storage apparatus in active state stops and thereby the storage apparatus in standby state transitions to active state. As yet another reason, an abnormality occurring in a communication path between the storage apparatus in active state and the storage apparatus in standby state may cause a disconnection between these storage apparatuses.

In the storage apparatus in active state while being disconnected from the storage apparatus in standby state, a new local copy pair may be registered and then a local copy based on the new pair may be executed. If the connection with the storage apparatus in standby state is re-established after the start of such a local copy, information about the new local copy pair is not registered in the storage apparatus in standby state. Therefore, if a failover occurs and thereby the storage apparatus in standby state transitions to active state, the storage apparatus now in active state is not able to take over the local copy. In order for the storage apparatus now in active state to take over the local copy, the local copy pair needs to be registered in the storage apparatus now in active state, and it takes time to resume the operation of the storage apparatus.

Further, information about a local copy pair may be deleted from the storage apparatus in standby state due to an abnormality occurring in the storage apparatus in standby state. If the storage apparatus in standby state resumes its operation and then a failover occurs and thereby the storage apparatus in standby state transitions to active state, it is not possible for the storage apparatus now in active state to take over the local copy.

Still further, in the storage apparatus in active state while being disconnected from the storage apparatus in standby state, the registration of a local copy pair may be deleted. If the connection with the storage apparatus in standby state is re-established after the deletion of the registration about the local copy pair, information corresponding to the deleted local copy pair remains in the storage apparatus in standby state.

To deal with the above, the exemplary variation is designed so that, when a connection with a storage apparatus in standby state is re-established, a storage apparatus in active state automatically adds or deletes management tables by comparing its locally stored management tables with management tables stored in the storage apparatus in standby state.

Figure 19:
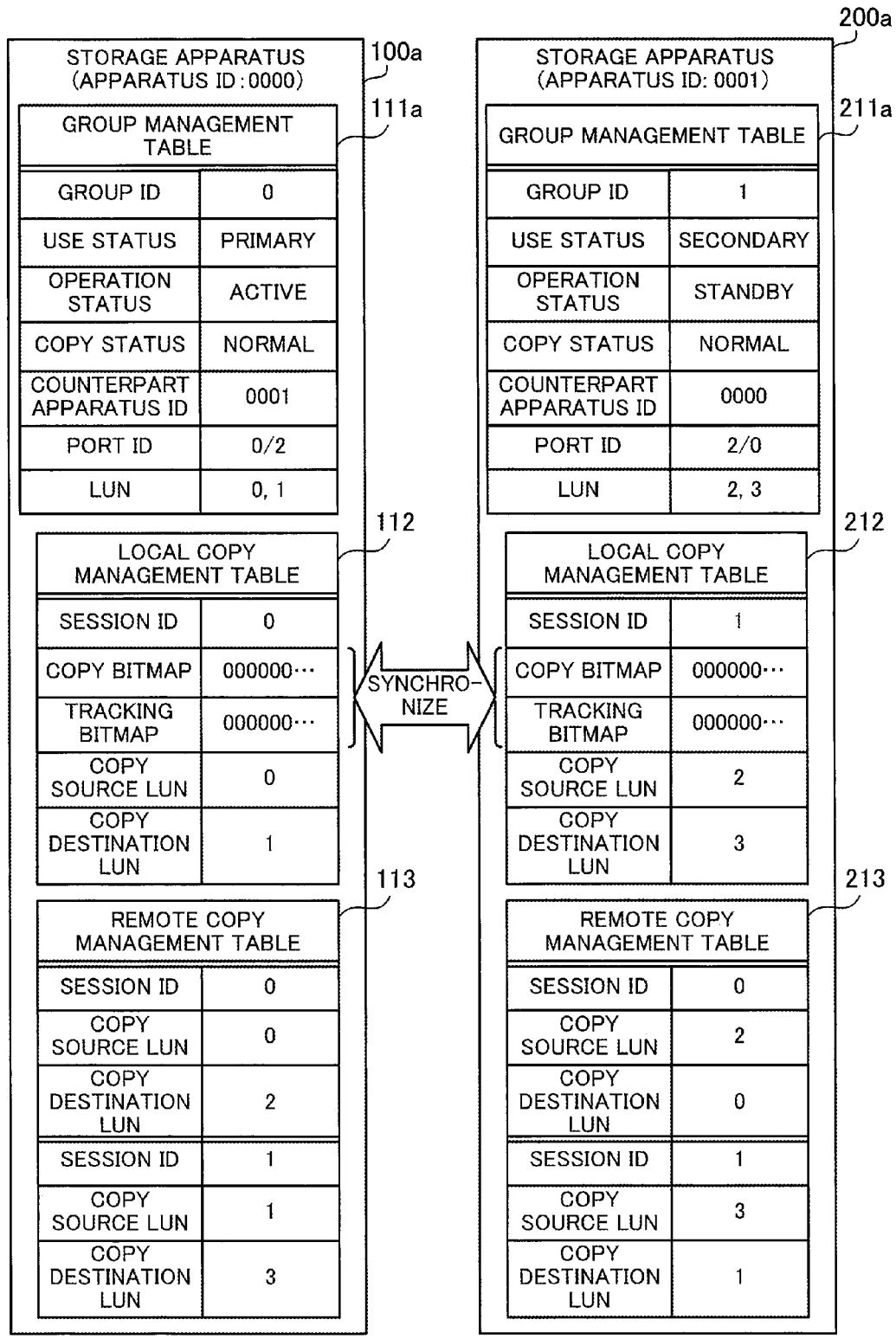
FIG. 19 illustrates an example of information that is set in storage apparatuses.

FIG. 19 illustrates an example of information that is set in storage apparatuses. The same reference numerals as in FIG. 11 are used in FIG. 19 to represent the same or like components.

Storage apparatuses 100a and 200a are different from the storage apparatuses 100 and 200 of the second embodiment in the following points. A group management table 111a is stored in a storage unit 110 of the storage apparatus 100a, and a group management table 211a is stored in a storage unit 210 of the storage apparatus 200a. The group management tables 111a and 211a each includes a "Copy Status" field in addition to the fields of the group management tables 111 and 211 of the second embodiment.

The "Copy Status" field contains NORMAL or HALT. NORMAL indicates that communication with another storage apparatus is available. Therefore, NORMAL in this field indicates that a remote copy between the storage apparatuses 100a and 200a is available. HALT indicates that communication with another storage apparatus is not available. For example, when either of the storage apparatuses 100a and 200a fails or when an abnormality occurs in communication, HALT is registered in the "Copy Status" field.

In the case where the "Copy Status" field contains HALT with respect to a storage apparatus 100a, 200a in active state, this storage apparatus 100a, 200a keeps on executing a local copy but does not execute a remote copy. When the "Copy Status" field is changed from HALT to NORMAL, the storage apparatuses 100a and 200a start to execute a remote copy.

In this connection, it is assumed that a local copy management table is prepared for each local copy pair. Therefore, when a new local copy pair is registered, a new local copy management table is created and stored for the new local copy pair. In addition, it is assumed that a remote copy management table is also prepared for each local copy pair. Therefore, two records of registration information made up of a session ID, a copy source LUN, and a copy destination LUN are registered in one remote copy management table. When a new local copy pair is registered, a new remote copy management table is created and stored for executing a remote copy of information based on the local copy pair.

Figure 20:
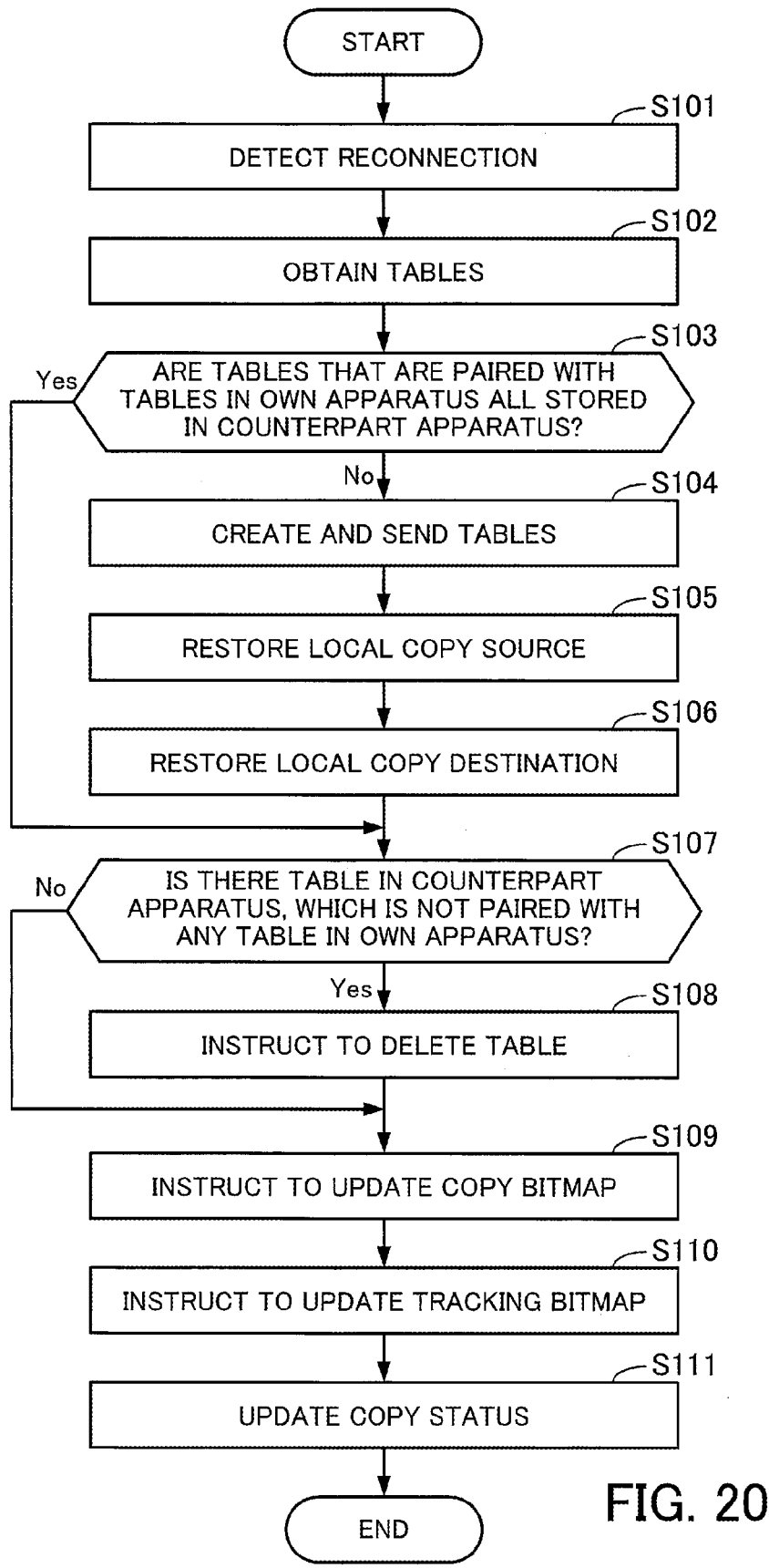
FIG. 20 is a flowchart illustrating an exemplary process that is performed when a connection with another storage apparatus is re-established.

FIG. 20 is a flowchart illustrating an exemplary process that is performed when a connection with another storage apparatus is re-established. In FIG. 20, it is assumed that the storage apparatus 100a is in active state and the storage apparatus 200a is in standby state, by way of example. It is also assumed that, before the process of FIG. 20 is performed, HALT is registered in the "Copy Status" fields of the group management tables 111a and 211a. For example, HALT is registered by the copy control units 130 and 230 that have detected a failure in communication.

(Step S101) The copy control unit 130 detects a reconnection with the storage apparatus 200a. For example, the copy control unit 130 detects the reconnection by receiving a notification indicating that the operation has been restored from the storage apparatus 200a that was in stopped state. Alternatively, during a communication failure, the copy control unit 130 may poll the storage apparatus 200a to detect a restoration of the communication from the failure.

(Step S102) The copy control unit 130 obtains all local copy management tables stored in the storage apparatus 200a therefrom.

(Step S103) The copy control unit 130 determines whether tables that are paired with the local copy management tables stored in the storage unit 110 are all stored in the storage apparatus 200a.

A table that is paired with a local copy management table is a counterpart local copy management table that enables the storage apparatus 200a, when transitioning to active state due to a failover, to take over the local copy based on the local copy management table, that is, a counterpart local copy management table that contains a copy bitmap and tracking bitmap synchronized with those of the local copy management table. Referring to the example of FIG. 19, the local copy management table 212 is a counterpart table of the local copy management table 112.

In the case where there is no counterpart table in the storage apparatus 200a for at least one of the local copy management tables stored in the storage unit 110, the process proceeds to step S104. This case is that a new local copy management table and a new remote copy management table are registered in the storage unit 110 and a local copy based on this local copy management table is started while the connection with the storage apparatus 200a is disconnected. The case may be that a counterpart table of a local copy management table stored in the storage unit 110 is deleted from the storage apparatus 200a while the connection with the storage apparatus 200a is disconnected.

If counterpart tables that are paired with the local copy management tables stored in the storage unit 110 are all stored in the storage apparatus 200a, the process proceeds to step 5107.

(Step S104) The copy control unit 130 detects a local copy management table whose counterpart table is not stored in the storage apparatus 200a from among the local copy management tables stored in the storage unit 110. The copy control unit 130 then creates a counterpart local copy management table of the detected local copy management table. In addition, the copy control unit 130 detects a remote copy management table corresponding to the detected local copy management table from among the remote copy management tables stored in the storage unit 110. The copy control unit 130 then creates a counterpart remote copy management table of the detected remote copy management table.

The detected remote copy management table and created counterpart remote copy management table contain the same session ID and opposite copy source and destination LUNs. Referring to the example of FIG. 19, the remote copy management table 113 corresponds to the local copy management table 112, and the remote copy management table 213 is a counterpart table of the remote copy management table 113.

Copy source and destination LUNs that are registered in the counterpart local copy management table of the detected local copy management table are determined based on the relationships between the copy source and destination LUNs registered in the detected local copy management table and the copy source and destination LUNs registered in the detected remote copy management table. At this time, any value does not need to be registered in the "Copy Bitmap" and "Tracking Bitmap" fields of the created local copy management table.

The copy control unit 130 sends the created local copy management table and remote copy management table to the storage apparatus 200a to instruct it to store these tables.

Since new logical volumes are indicated in the "Copy Source LUN" and "Copy Destination LUN" fields in the created local copy management table, the copy control unit 130 sends information (size and others) about the new logical volumes to the storage apparatus 200a to instruct it to configure the logical volumes therein.

(Step S105) The copy control unit 130 restores the local copy source logical volume configured in the storage apparatus 200a. More specifically, the copy control unit 130 sends the data of the logical volume registered as a local copy source in the storage apparatus 100a, to the storage apparatus 200a to store the data in the logical volume registered as a local copy source in the storage apparatus 200a.

(Step S106) The copy control unit 130 restores the local copy destination logical volume configured in the storage apparatus 200a. More specifically, the copy control unit 130 sends the data of the logical volume registered as a local copy destination in the storage apparatus 100a, to the storage apparatus 200a to store the data in the logical volume registered as a local copy destination in the storage apparatus 200a.

(Step S107) The copy control unit 130 determines whether there is a table that is not paired with any local copy management table in the storage unit 110, among the local copy management tables stored in the storage apparatus 200a. If there is a table satisfying this condition, the process proceeds to step S108. This case is that at least one local management table and its corresponding remote copy management table are deleted from the storage unit 110 while the connection with the storage apparatus 200a is disconnected. If there is no table that satisfies the above condition, the process proceeds to step S109.

(Step S108) The copy control unit 130 instructs the storage apparatus 200a to delete the table which is not paired with any local copy management table in the storage unit 110, among the local copy management tables stored in the storage apparatus 200a.

(Step S109) The copy control unit 130 sends the copy bitmaps registered in the local copy management tables stored in the storage unit 110 to the storage apparatus 200a to instruct it to update the copy bitmaps in the counterpart local copy management tables stored therein.

(Step S110) The copy control unit 130 sends the tracking bitmaps registered in the local copy management tables stored in the storage unit 110 to the storage apparatus 200a to instruct it to update the tracking bitmaps in the counterpart local copy management tables stored therein.

(Step S111) The copy control unit 130 updates the "Copy Status" field of the group management table 111a stored in the storage unit 110 from HALT to NORMAL. At this time, if there is a change in a local copy source logical volume or a local copy destination logical volume, the copy control unit 130 reflects this change on the "LUN" field in the group management table 111a.

In addition, the copy control unit 130 instructs the storage apparatus 200a to update the "Copy Status" field of the group management table 211a stored in the storage apparatus 200a from HALT to NORMAL. At this time, if there is a change in a local copy source logical volume or a local copy destination logical volume, the copy control unit 130 instructs the storage apparatus 200a to reflect this change on the "LUN" field in the group management table 211a.

As described above, through the process of FIG. 20, when a connection with a storage apparatus in standby state is re-established, table setting is performed under the control of a storage apparatus in active state so that local copy management tables and remote copy management tables match between the storage apparatuses. Since the remote copy management tables match, a remote copy may be started after the re-establishment of the connection, without the need of administrator's setting operation. In addition, since the local copy management tables match, a storage apparatus that has transitioned to active state is able to take over a local copy after a failover, without the need of administrator's setting operation.

Figure 21:
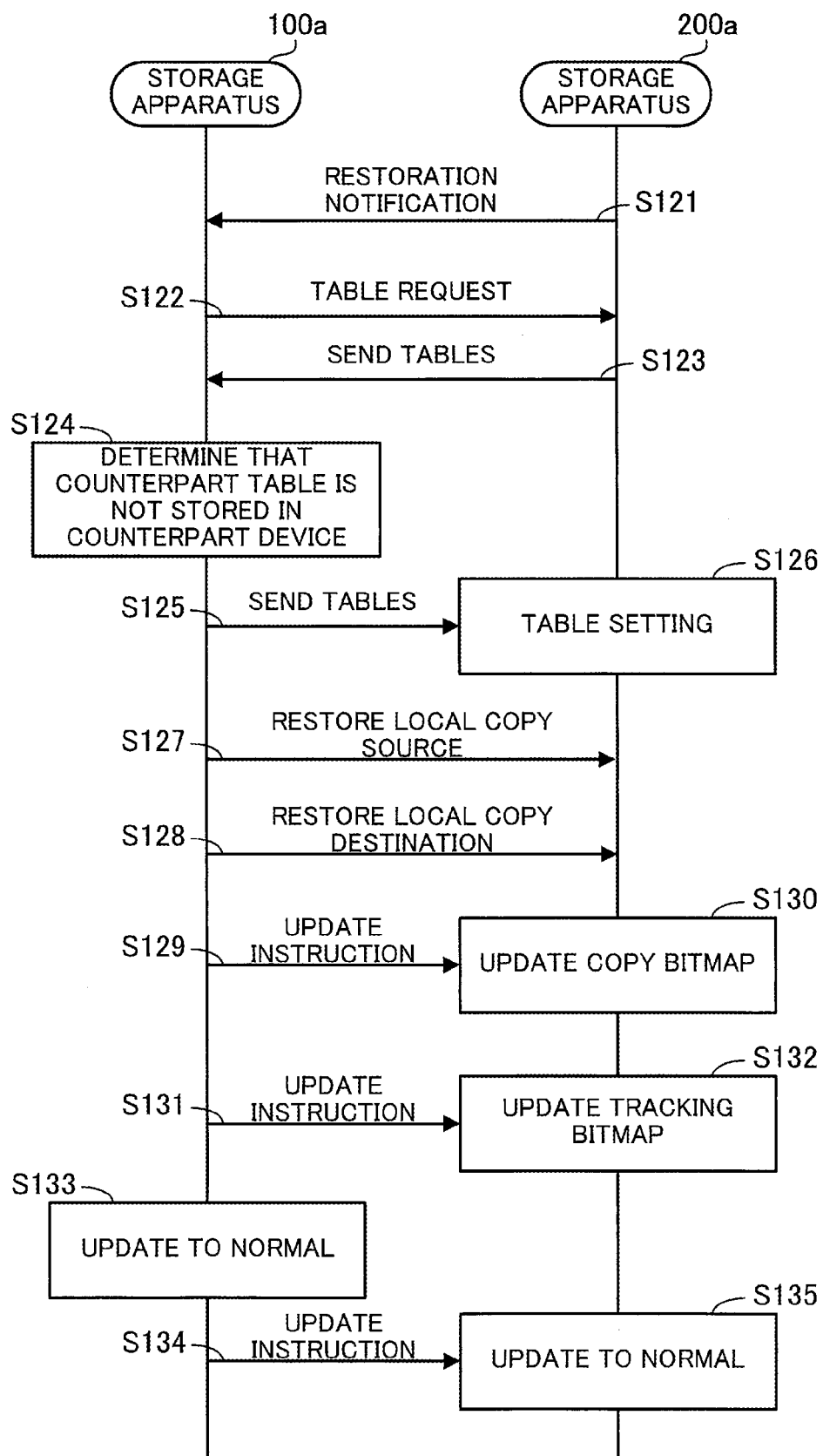
FIG. 21 is a sequence diagram illustrating an exemplary process that is performed when a connection is re-established.

FIG. 21 is a sequence diagram illustrating an exemplary process that is performed when a connection is re-established. In FIG. 21, it is assumed that the storage apparatus 200a stops and thereby a connection is disconnected when the storage apparatus 100a is in active state, and then a new local copy pair is registered in the storage apparatus 100a while the connection is disconnected, by way of example.

(Step S121) The storage apparatus 200a notifies the storage apparatus 100a that the operation of the storage apparatus 200a has been restored.

(Step S122) The copy control unit 130 of the storage apparatus 100a requests the storage apparatus 200a to send local copy management tables and remote copy management tables.

(Step S123) The copy control unit 230 of the storage apparatus 200a sends the local copy management tables and remote copy management tables stored in the storage unit 210 to the storage apparatus 100a.

(Step S124) The copy control unit 130 determines that a counterpart table that is paired with a local copy management table stored in the storage unit 110 is not stored in the storage apparatus 200a.

(Step S125) The copy control unit 130 detects the local copy management table whose counterpart table is not stored in the storage apparatus 200a, from among the local copy management tables stored in the storage unit 110. The copy control unit 130 creates a counterpart local copy management table of the detected local copy management table. In addition, the copy control unit 130 detects a remote copy management table corresponding to the detected local copy management table from among the remote copy management tables stored in the storage unit 110. The copy control unit 130 then creates a counterpart remote copy management table of the detected remote copy management table. The copy control unit 130 sends the created counterpart local copy management table and the created counterpart remote copy management table to the storage apparatus 200a.

(Step S126) The copy control unit 230 receives and stores the local copy management table and remote copy management table in the storage unit 210.

(Step S127) The copy control unit 130 restores a local copy source logical volume configured in the storage apparatus 200a.

(Step S128) The copy control unit 130 restores a local copy destination logical volume configured in the storage apparatus 200a.

(Step S129) The copy control unit 130 sends the copy bitmaps registered in the local copy management tables stored in the storage unit 110 to the storage apparatus 200a to instruct it to update the copy bitmaps registered therein.

(Step S130) The copy control unit 230 updates the copy bitmaps in the local copy management tables stored in the storage unit 210 to the received copy bitmaps.

(Step S131) The copy control unit 130 sends the tracking bitmaps registered in the local copy management tables stored in the storage unit 110 to the storage apparatus 200a to instruct it to update the tracking bitmaps registered therein.

(Step S132) The copy control unit 230 updates the tracking bitmaps in the local copy management tables stored in the storage unit 210 to the received tracking bitmaps.

(Step S133) The copy control unit 130 updates the "Copy Status" field from HALT to NORMAL in the group management table 111a stored in the storage unit 110.

(Step S134) The copy control unit 130 instructs the storage apparatus 200a to update the "Copy Status" field from HALT to NORMAL in the group management table 211a. In addition, the copy control unit 130 instructs the storage apparatus 200a to add information to the "LUN" field of the group management table 211a. The additional information is LUNs registered in the "Copy Source LUN" and "Copy Destination LUN" fields in the local copy management table sent at step S125.

(Step S135) The copy control unit 230 updates the group management table 211a in accordance with the instruction from the storage apparatus 100a.

Note that steps 5127 and 5128 may be executed in a reverse order and so are steps S129 and S131.

The processing functions of each apparatus described in the above embodiments (for example, storage apparatuses 1 and 2, controller modules 101 and 201, business server 300, and management server 400) may be implemented by using a computer. In this case, a program describing the processing content of the functions of each apparatus is provided and executed on a computer, so that the processing functions are implemented on the computer. The program describing the processing content is recorded on a computer-readable recording medium. Computer-readable recording media include a magnetic storage device, an optical disc, a magneto-optical recording medium, a semiconductor memory, and others. Magnetic storage devices include a hard disk drive (HDD), Flexible Disk (FD), magnetic tape, and others. Optical discs include a Digital Versatile Disc (DVD), DVD-RAM, Compact Disc-Read Only Memory (CD-ROM), CD-Recordable (CD-R), CD-ReWritable (CD-RW), and others. Magneto-optical recording media include MO and others.

To distribute the program, for example, portable recording media, such as DVD or CD-ROM, on which the program is recorded may be put on sale. Alternatively, the program may be stored in the storage device of a server computer and may be transferred from the server computer to another computer through a network.

A computer that executes the program may store the program recorded on a portable recording medium or the program received from the server computer to its local storage device, read the program from the local storage device, and then run the program. In this connection, the computer may run the program while reading the program directly from the portable recording medium. In addition, the computer may run the program while receiving the program from the server computer connected over a network.

According to one aspect, it is possible to improve the safety of data stored in a storage apparatus in a short time when a failover occurs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage apparatus comprising:
    a storage device including a first storage area, a second storage area, and a third storage area, the third storage area storing setting information for performing a first copy process of copying data stored in the first storage area to the second storage area; and
    a processor that performs a procedure including:
        stopping the first copy process based on the setting information under a first state where a different storage apparatus including a fourth storage area and a fifth storage area is in active state and performs a first access process, a second copy process, a third copy process, and a fourth copy process and the storage apparatus is in standby state, the first access process being to access the fourth storage area in response to a request from an information processing apparatus, the second copy process being to copy data stored in the fourth storage area to the fifth storage area, the third copy process being to copy data stored in the fourth storage area to the first storage area so that data in the fourth storage area and data in the first storage area are synchronized with each other, the fourth copy process being to copy data stored in the fifth storage area to the second storage area so that data in the fifth storage area and data in the second storage area are synchronized with each other; and
    performing a second access process of accessing the first storage area in response to a request from the information processing apparatus and the first copy process based on the setting information under a second state where the different storage apparatus has transitioned to standby state and the storage apparatus has transitioned to active state.

2. The storage apparatus according to claim 1, wherein the procedure further includes:
    copying, under the first state, progress information from the different storage apparatus to the third storage area so that the progress information is synchronized between the different storage apparatus and the storage apparatus, the progress information indicating a progress of the second copy process; and
    copying, when a state is changed to the second state while the different storage apparatus performs the second copy process, data that is yet to be copied to the fifth storage area in the second copy process, among data stored in the first storage area, to the second storage area with reference to the copied progress information stored in the third storage area.

3. The storage apparatus according to claim 1, wherein:
    the procedure further includes copying, under the first state, update information from the different storage apparatus to the third storage area so that the update information is synchronized between the different storage apparatus and the storage apparatus, the update information indicating a location of data updated as requested by the information processing apparatus among data stored in the fourth storage area after start of the second copy process; and
    the first copy process performed after a state is changed to the second state includes copying the updated data among data stored in the first storage area to the second storage area with reference to the copied update information stored in the third storage area.

4. The storage apparatus according to claim 1, wherein the procedure further includes setting copy setting information in the different storage apparatus when communication with the different storage apparatus is restored from a failure during the second state, the copy setting information being used for performing the second copy process, a process of copying data stored in the first storage area to the fourth storage area so that data in the first storage area and data in the fourth storage area are synchronized with each other, and a process of copying data stored in the second storage area to the fifth storage area so that data in the second storage area and data in the fifth storage area are synchronized with each other.

5. A storage system comprising:
   a first storage apparatus including
      a first storage device including a first storage area and a second storage area, and
      a first processor that performs, when the first storage apparatus is in active state, a first access process, a first copy process, a second copy process, and a third copy process, the first access process being to access the first storage area in response to a request from an information processing apparatus, the first copy process being to copy data stored in the first storage area to the second storage area, the second copy process being to copy data stored in the first storage area to a third storage area so that data in the first storage area and data in the third storage area are synchronized with each other, the third copy process being to copy data stored in the second storage area to the fourth storage area so that data in the second storage area and data in the fourth storage area are synchronized with each other; and
   a second storage apparatus including
      a second storage device including the third storage area, the fourth storage area, and a fifth storage area, the fifth storage area storing setting information for performing a fourth copy process of copying data stored in the third storage area to the fourth storage area, and
      a second processor that stops, when the second storage apparatus is in standby state, the fourth copy process based on the setting information, and when the first storage apparatus has transitioned to standby state and the second storage apparatus has transitioned to active state, performs a second access process of accessing the third storage area in response to a request from the information processing apparatus and the fourth copy process based on the setting information.

6. The storage system according to claim 5, wherein, when communication with the second storage apparatus fails and then is restored while the first storage apparatus is in active state, the first processor determines whether the setting information is stored in the second storage apparatus, and when the setting information is not stored in the second storage apparatus, sends the setting information to the second storage apparatus to cause the second storage apparatus to store the setting information.

7. A non-transitory computer-readable storage medium storing a storage control program that causes a computer installed in a storage apparatus to perform a procedure comprising:
   storing, in a memory, setting information for performing a first copy process of copying data stored in a first storage area to a second storage, the first storage area and the second storage area being provided in the storage apparatus;
   stopping the first copy process based on the setting information under a first state where a different storage apparatus including a third storage area and a fourth storage area is in active state and performs a first access process, a second copy process, a third copy process, and a fourth copy process and the storage apparatus is in standby state, the first access process being to access the third storage area in response to a request from an information processing apparatus, the second copy process being to copy data stored in the third storage area to the fourth storage area, the third copy process being to copy data stored in the third storage area to the first storage area so that data in the third storage area and data in the first storage area are synchronized with each other, the fourth copy process being to copy data stored in the fourth storage area to the second storage area so that data in the fourth storage area and data in the second storage area are synchronized with each other; and
   performing a second access process of accessing the first storage area in response to a request from the information processing apparatus and the first copy process based on the setting information under a second state where the different storage apparatus has transitioned to standby state and the storage apparatus has transitioned to active state.

* * * * *